June 2, 1942.  E. T. FERNGREN  2,285,150
APPARATUS FOR FORMING HOLLOW ARTICLES FROM PLASTIC MATERIAL
Original Filed Aug. 10, 1938  15 Sheets—Sheet 1

INVENTOR
Enoch T. Ferngren
by Brown & Parham
Attorneys

June 2, 1942. E. T. FERNGREN 2,285,150
APPARATUS FOR FORMING HOLLOW ARTICLES FROM PLASTIC MATERIAL
Original Filed Aug. 10, 1938 15 Sheets-Sheet 3
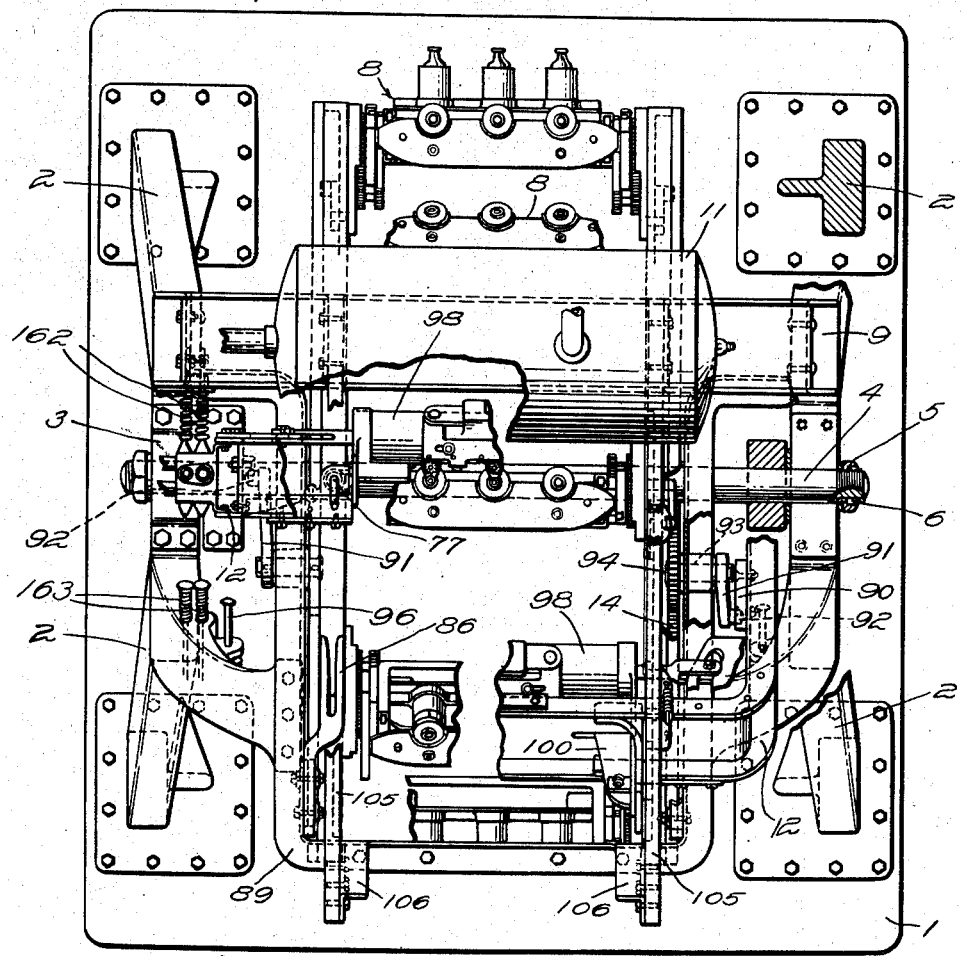
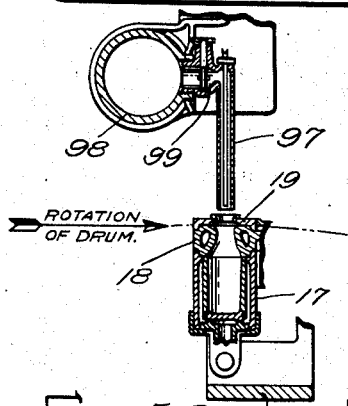
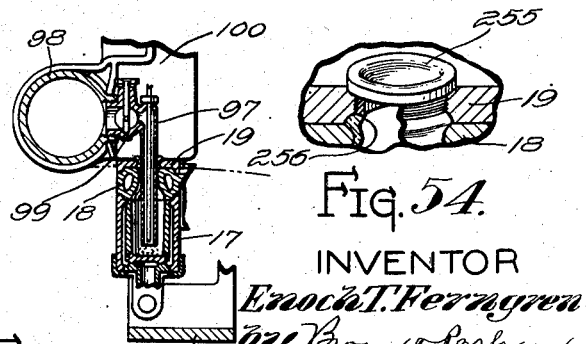
INVENTOR
Enoch T. Ferngren
by Brown & Parham
Attorneys Inventor
Enoch T. Ferngren
by Brown Parham
Attorneys June 2, 1942. E. T. FERNGREN 2,285,150
APPARATUS FOR FORMING HOLLOW ARTICLES FROM PLASTIC MATERIAL
Original Filed Aug. 10, 1938 15 Sheets-Sheet 5
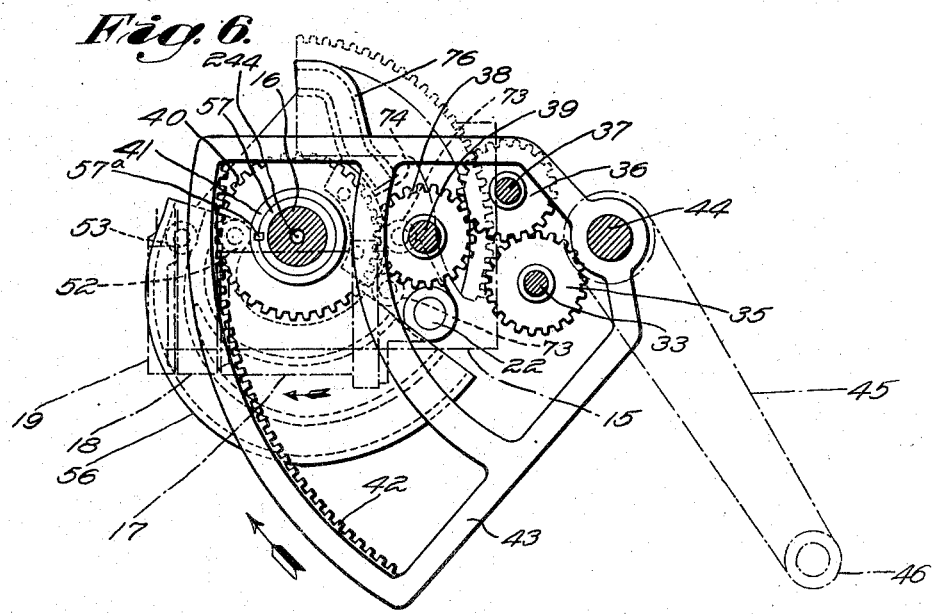
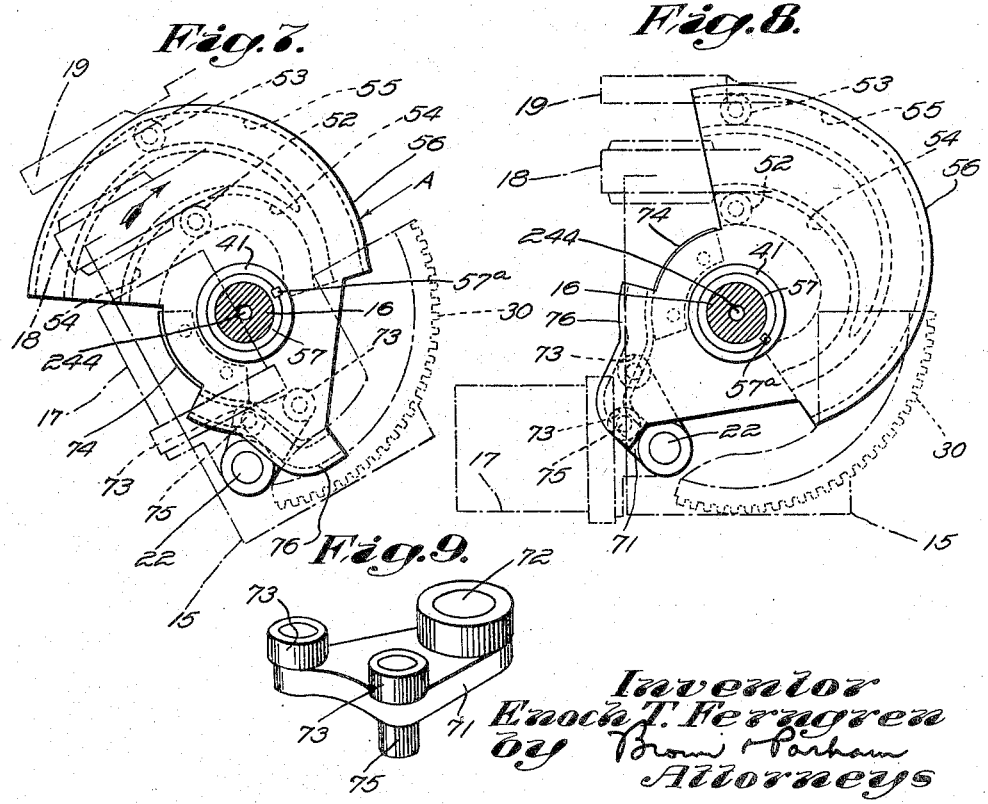

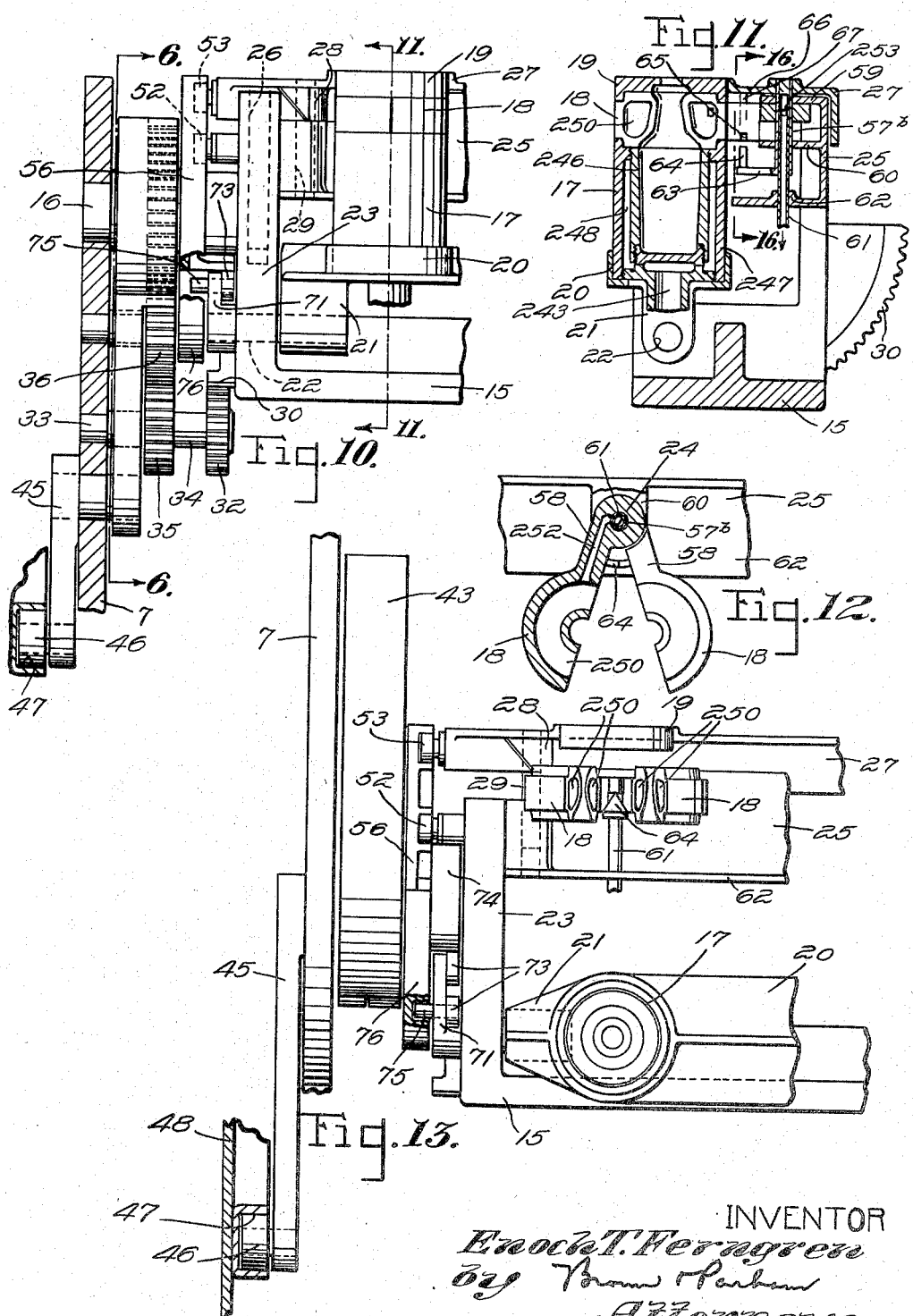

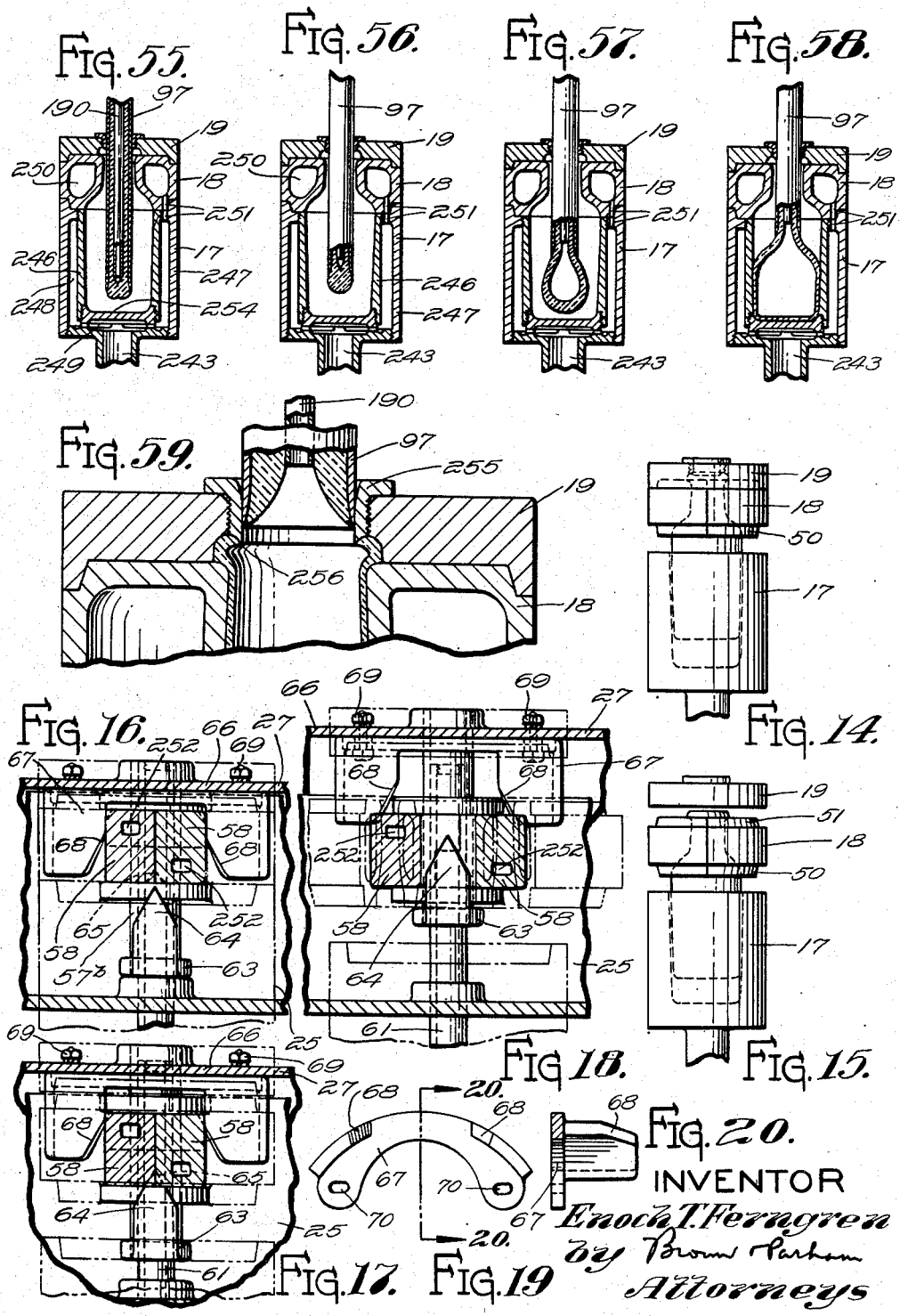

June 2, 1942. E. T. FERNGREN 2,285,150
APPARATUS FOR FORMING HOLLOW ARTICLES FROM PLASTIC MATERIAL
Original Filed Aug. 10, 1938 15 Sheets-Sheet 8
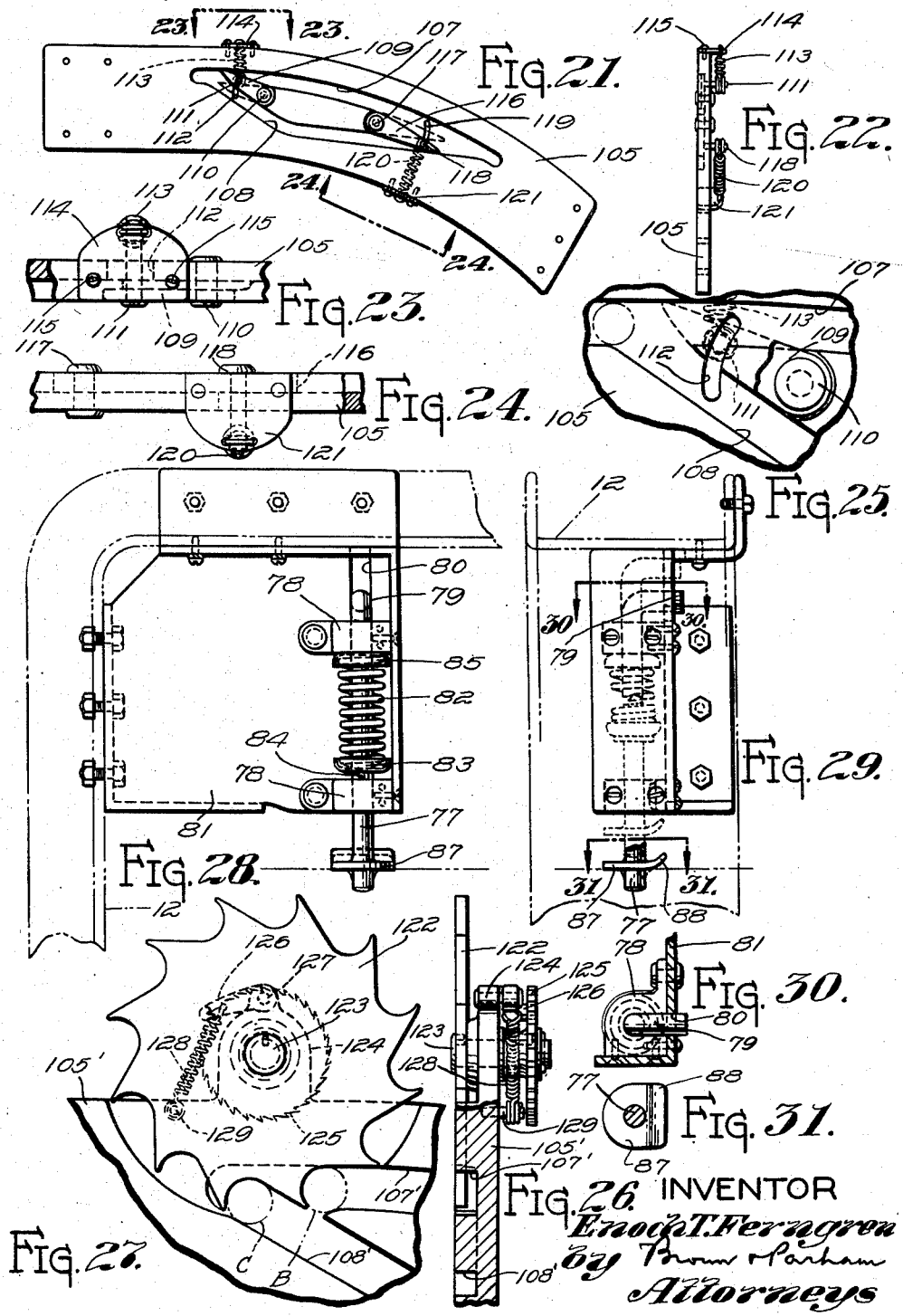

June 2, 1942. E. T. FERNGREN 2,285,150
APPARATUS FOR FORMING HOLLOW ARTICLES FROM PLASTIC MATERIAL
Original Filed Aug. 10, 1938 15 Sheets-Sheet 9
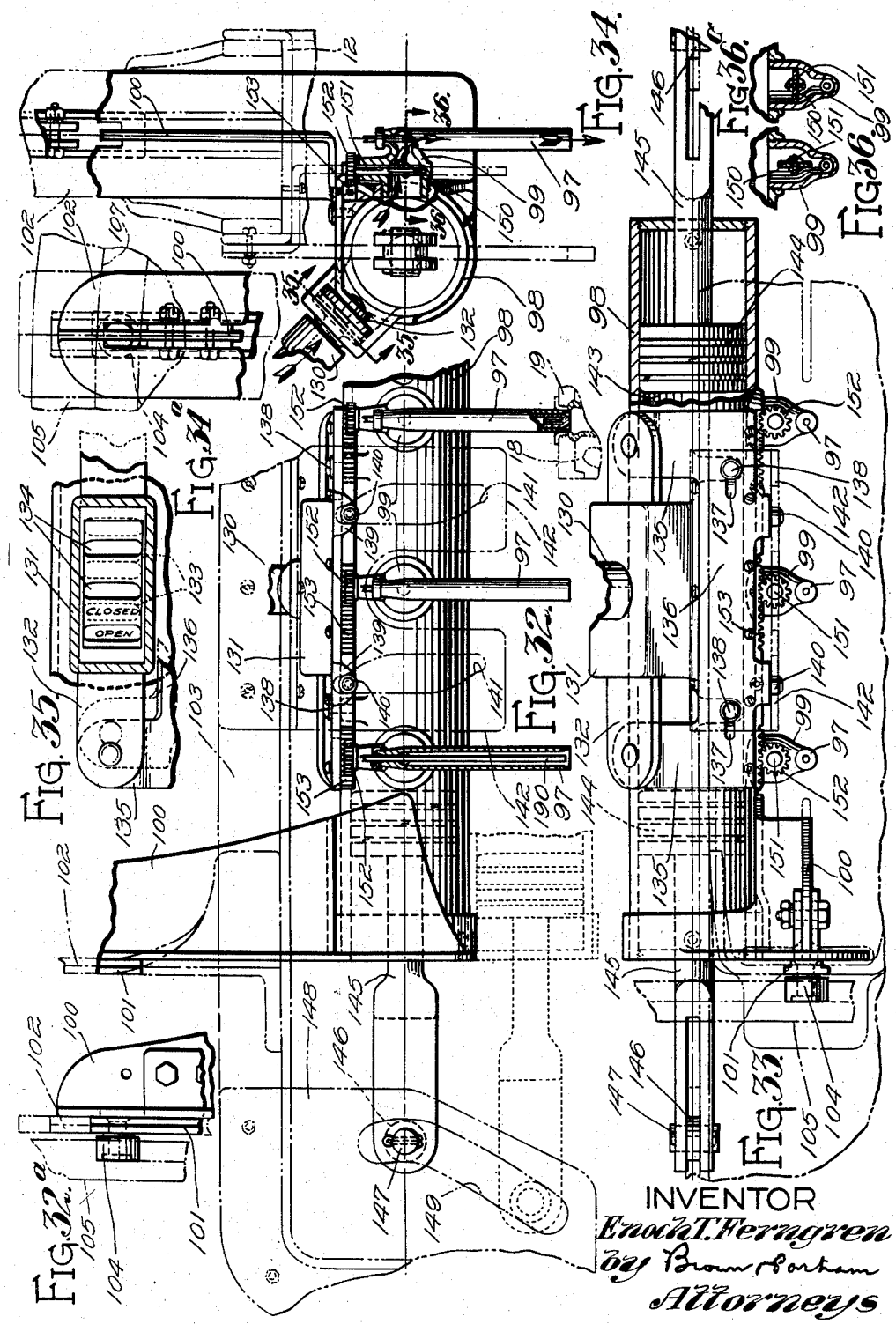
INVENTOR
Enoch T. Ferngren
by Brown Bortham
Attorneys

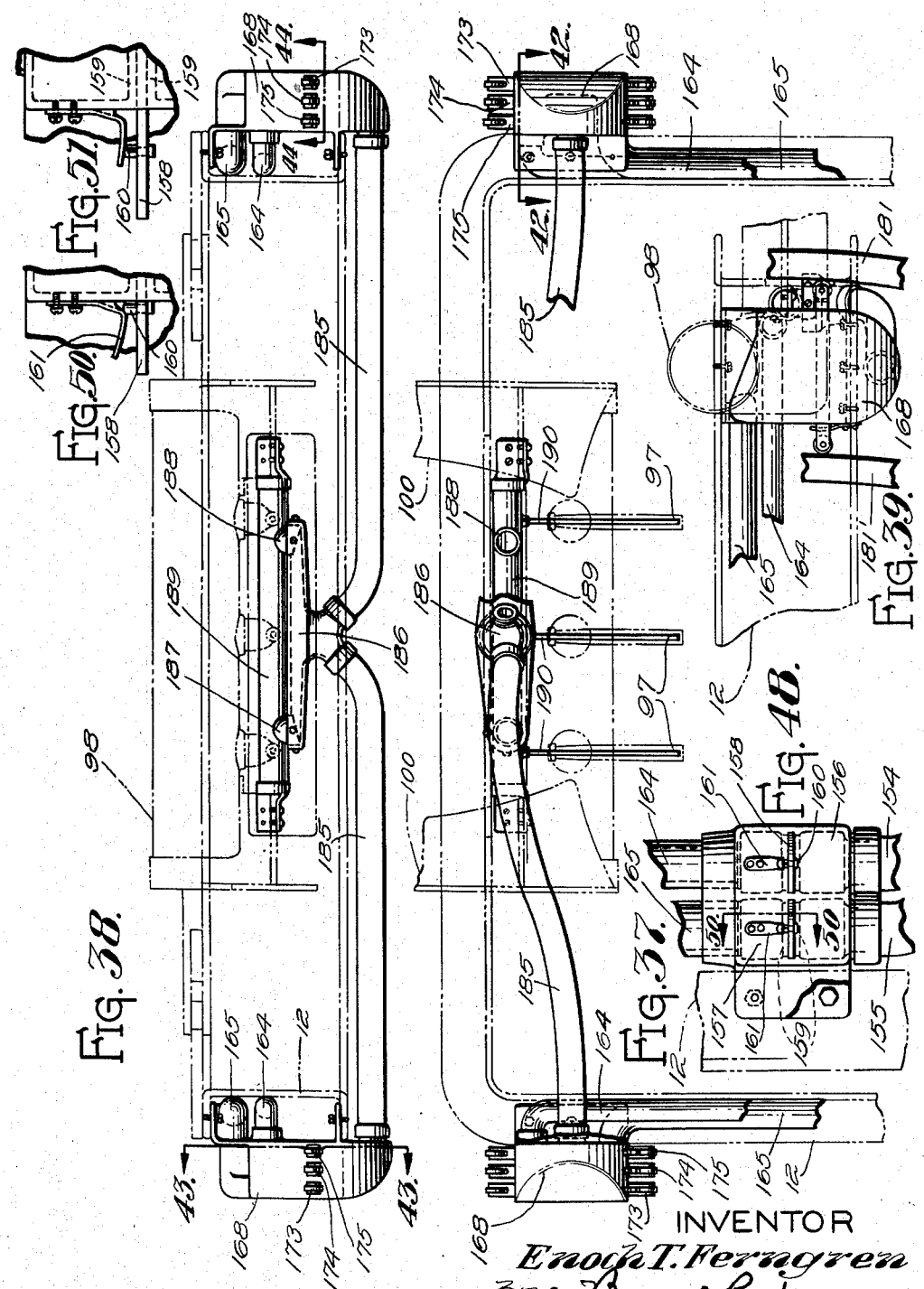

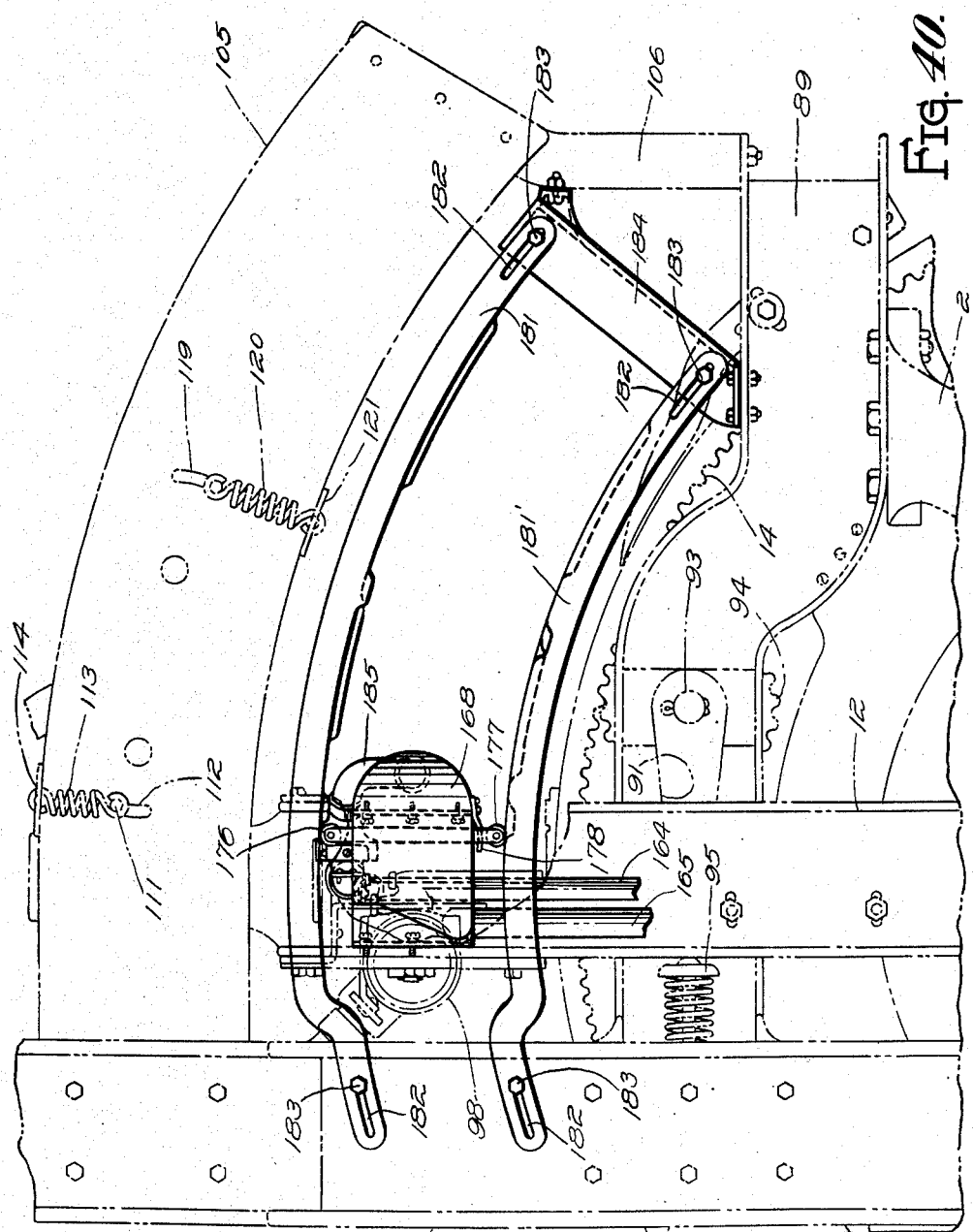

June 2, 1942. E. T. FERNGREN 2,285,150
APPARATUS FOR FORMING HOLLOW ARTICLES FROM PLASTIC MATERIAL
Original Filed Aug. 10, 1938 15 Sheets-Sheet 12
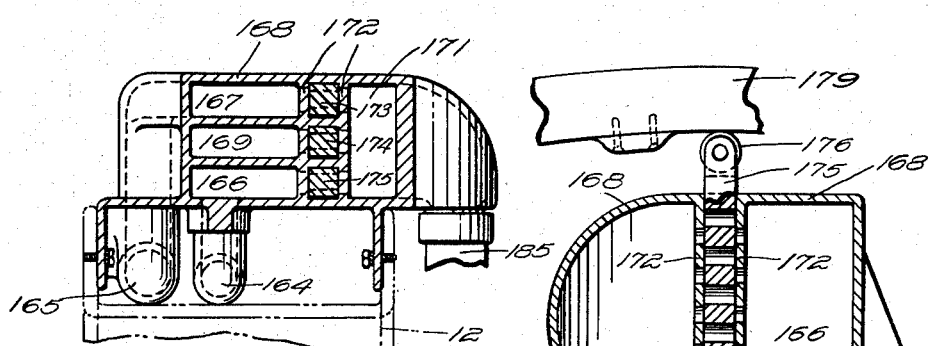
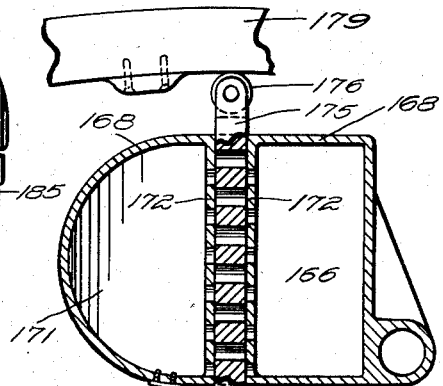
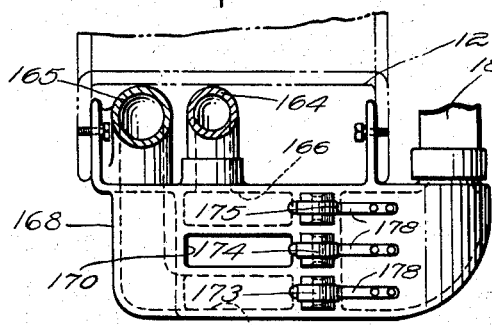
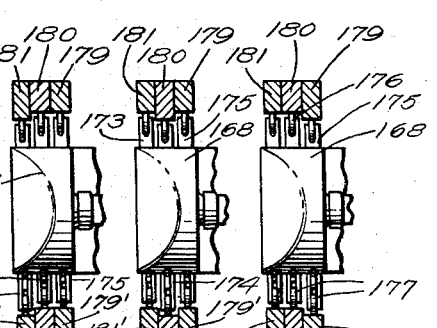
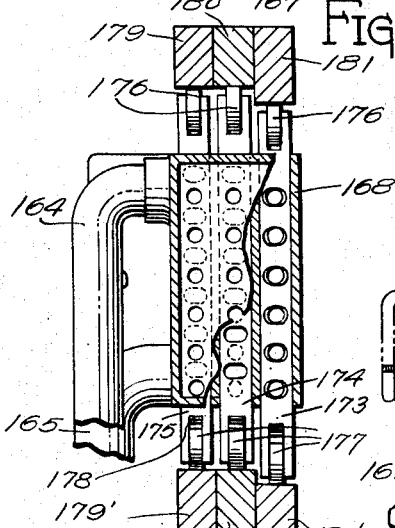
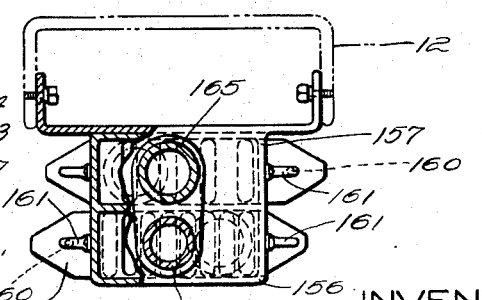
INVENTOR
Enoch T. Ferngren
by Brown Parham
Attorneys

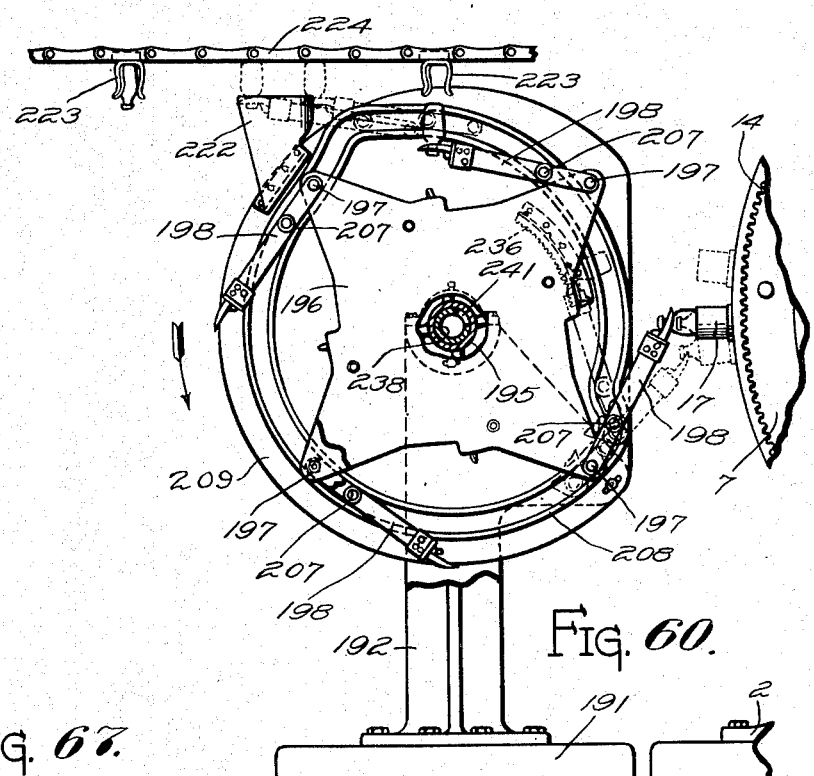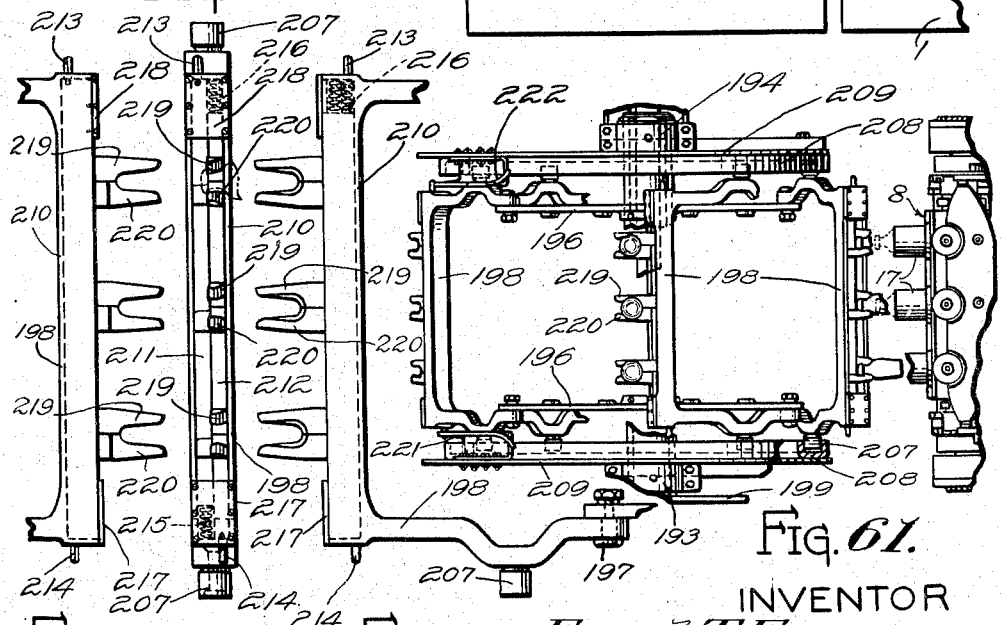

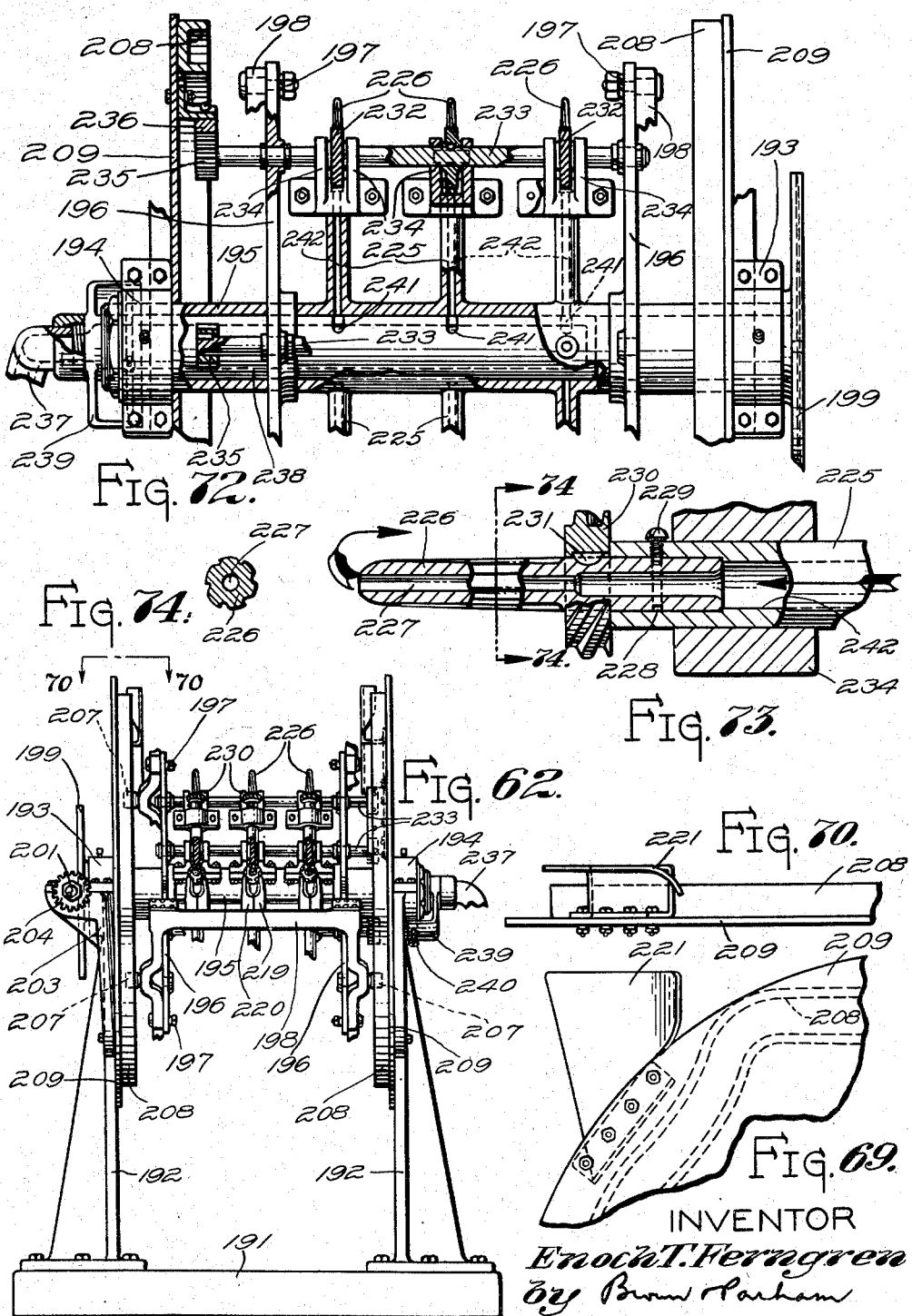

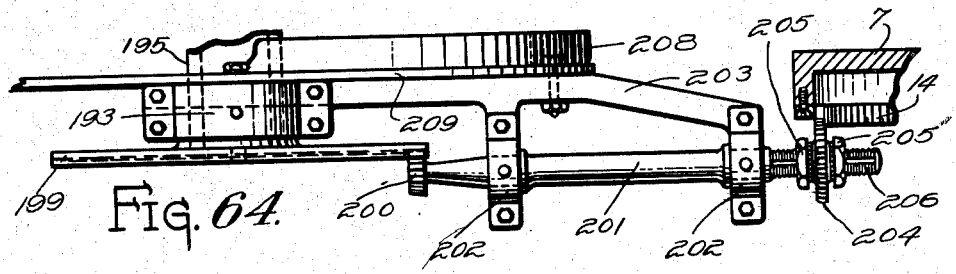
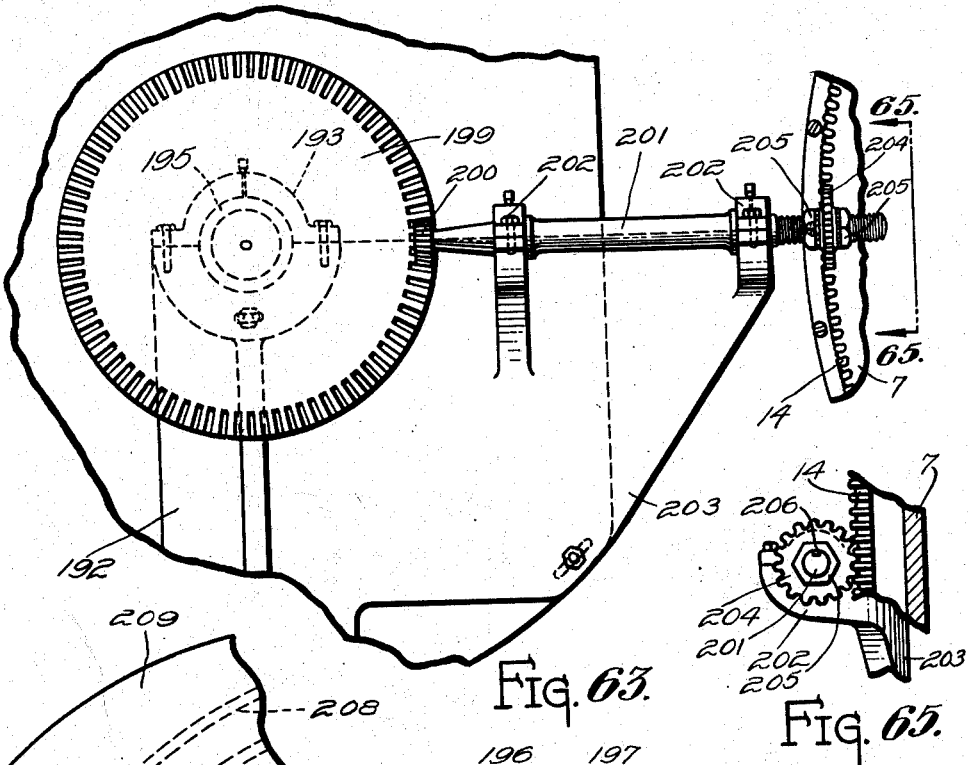
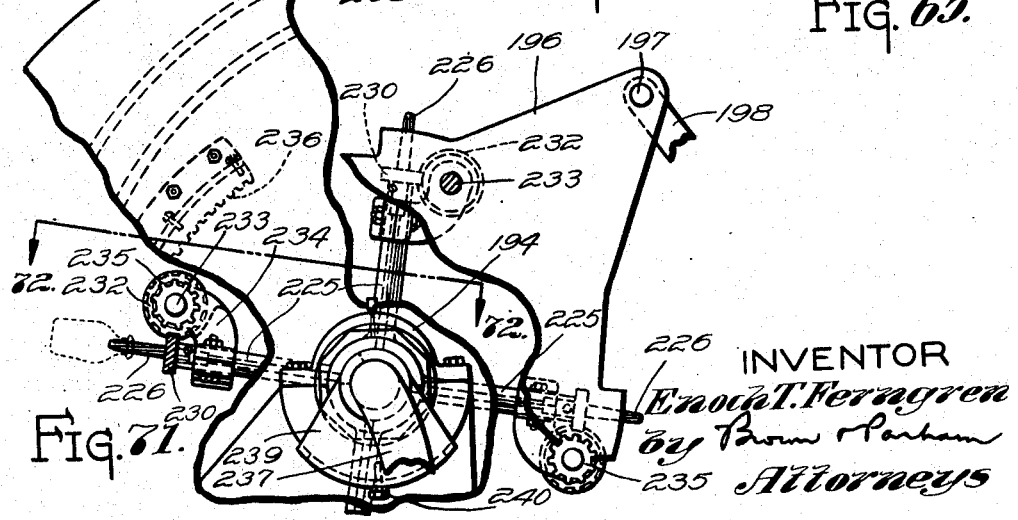

Patented June 2, 1942

2,285,150

UNITED STATES PATENT OFFICE 2,285,150

APPARATUS FOR FORMING HOLLOW ARTICLES FROM PLASTIC MATERIAL

Enoch T. Ferngren, Little Neck, N. Y., assignor to Plax Corporation, Hartford, Conn., a corporation of Delaware Original application August 10, 1938, Serial No. 224,001. Divided and this application June 19, 1940, Serial No. 341,288

12 Claims. (Cl. 18—5)

The present application relates to apparatus for forming hollow articles from plastic material and more particularly to certain phases of the apparatus for carrying out the process disclosed and claimed in applicant's Patent No. 2,128,239, granted Aug. 30, 1938. Applicant's parent application Serial No. 224,001, filed Aug. 10, 1938, which has become Patent No. 2,230,190, of which the present application is a division, is a continuation in part of the subject matter disclosed in applicant's aforesaid Patent No. 2,128,239.

In said patent there is disclosed a process of forming articles from organic plastic material, such as cellulose acetate compounds, by extrusion and blowing, the patent illustrating diagrammatically a nozzle through which organic plastic material may be extruded in hollow tubular form and a mold which is made in several parts, as specifically hereinafter set forth. The leading end of the hollow tubular body of plastic material is closed, preferably before the remainder of the material to form an article is extruded from the nozzle, this closing being effected either by introducing the nozzle downwardly into the mold to bring its lower end to a position adjacent to the bottom thereof and then causing the plastic material to mushroom out against the mold bottom, or by forming the nozzle with its inner tubular member terminating short of the lower end of its outer tubular member and applying vacuum through the interior of the inner tubular member to assist the plastic material in flowing together adjacent to the discharge end of the nozzle. This latter manner of closing the leading end of the hollow body may be made use of at any position of the nozzle in relation to the mold, either partly within the mold or at a position wholly outside the mold. This patent also discloses various ways of severing the plastic material used to form an article from that remaining within the extrusion nozzle at the completion of the formation of the article.

Applicant's parent application 224,001, of which the present application is a division, discloses apparatus for carrying out the process of applicant's Patent No. 2,128,239 in a manner which will be relatively rapid from the point of view of mass production, yet permit adequate time for the making of each individual article. The present application relates more particularly to the apparatus for operating the molds in opening and closing them and moving them as hereinafter described.

An object of the invention is to provide a novel mold construction and novel arrangements for opening and closing such a mold. Specifically this phase of the invention includes mounting a mold on a rotary carrier in such a way that upon the opening of the mold for the release of an article, such as a bottle formed therein, the article will be disposed in a lower one-part, cup-like portion of the mold and positioned in such a way in respect to the carrier that the neck portion of the bottle may be easily accessible to take-out means disposed radially outward of the carrier. This is particularly important in the case (herein disclosed) of a carrier rotated about a horizontal axis and having a number of groups of molds, each of which includes several individual molds.

Further objects and advantages of the present invention will become apparent from the following specification and appended claims, when taken in connection with the accompanying drawings in which:

Fig. 3 is a view principally in plan, but with some parts broken away and in horizontal section of the whole machine, certain mechanisms being shown in part at the left of the figure in one position and in part at the right in another position;

Fig. 6 is a fragmentary detail view of certain of the mold operating mechanisms partly in elevation and partly in section, taken substantially on the line 6—6 of Fig. 10;

Figure 1:
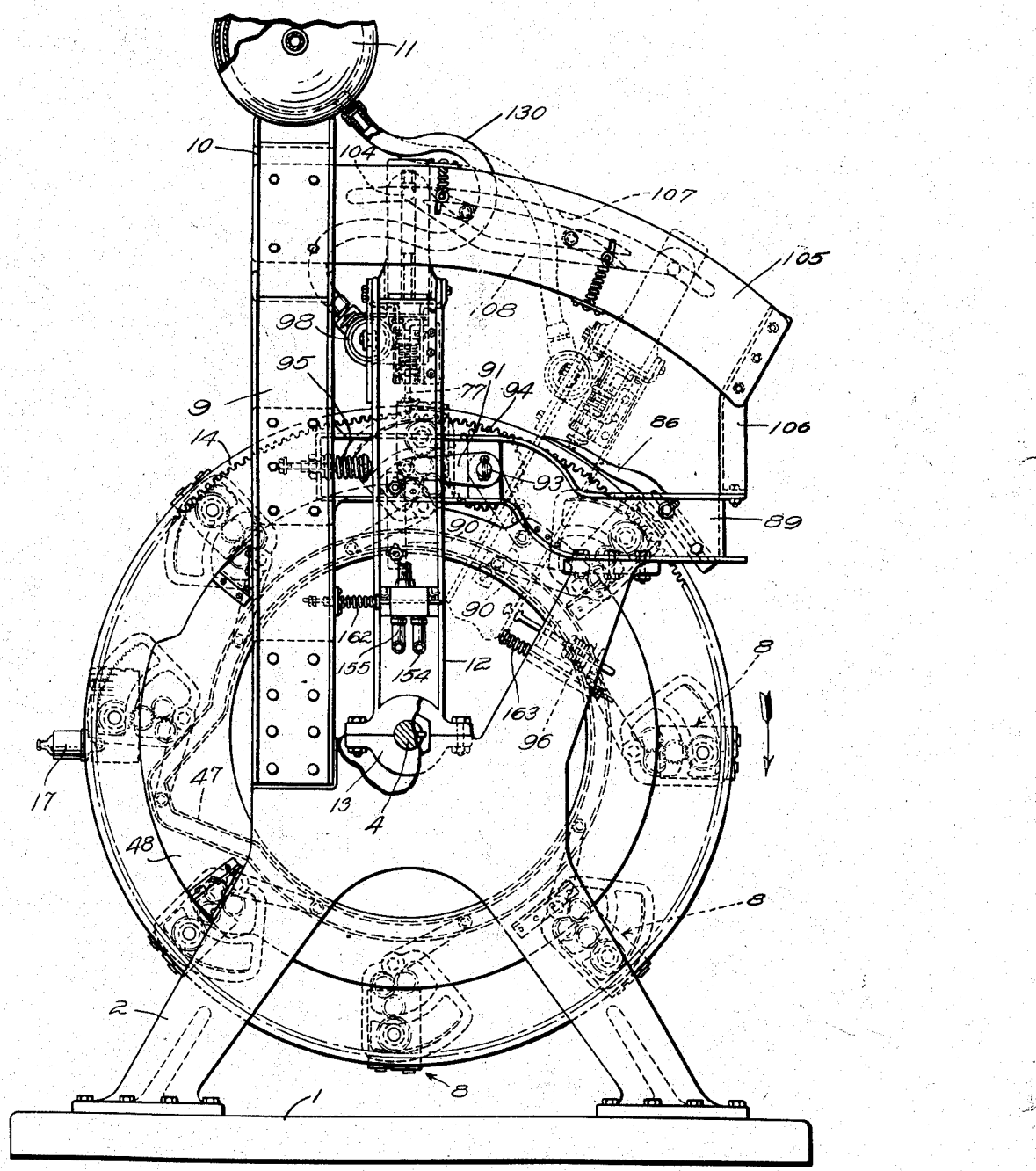
Figure 1 is a view principally in elevation of substantially the entire forming machine, certain parts being shown in full lines in one position and in dotted lines in other positions.
Figure 4:
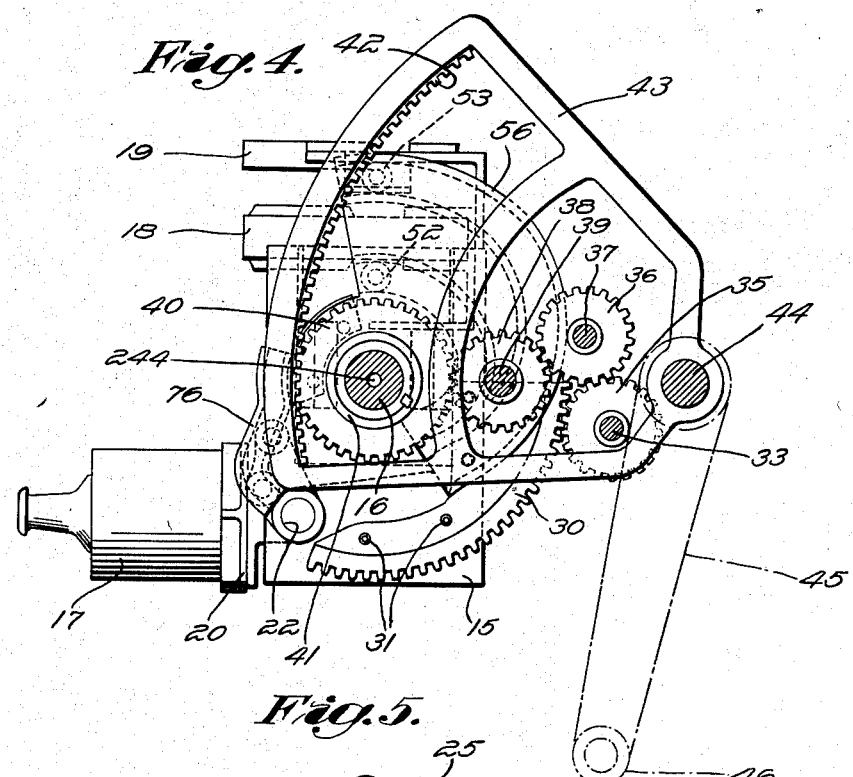
Fig. 4 is a fragmentary view principally in side elevation but with certain parts in section substantially on the line 6—6 of Fig. 10 showing certain of the mold operating mechanisms.
Figure 5:
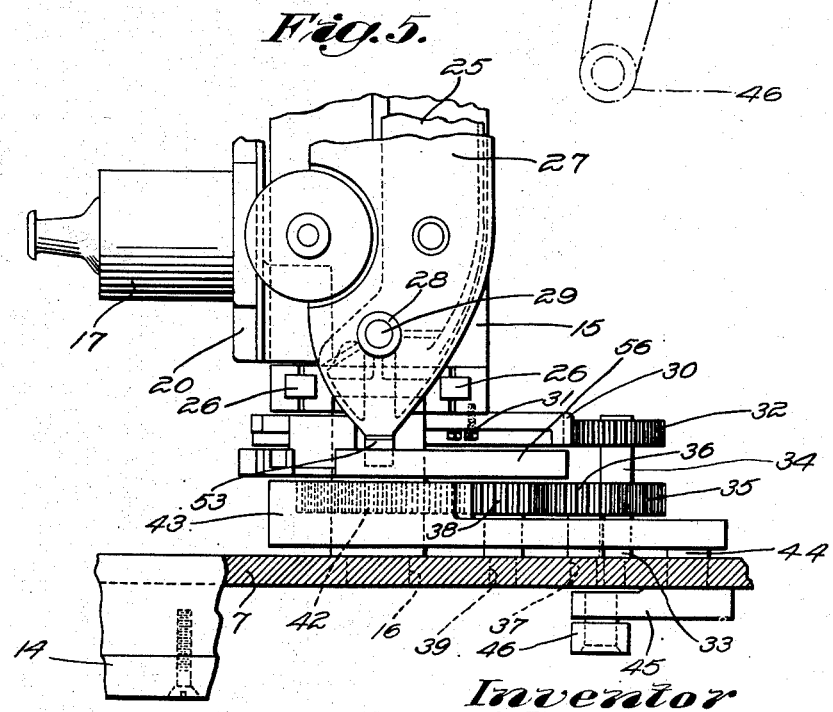
Fig. 5 is a fragmentary view principally in plan and with certain parts broken away and in horizontal section showing the mechanism of Fig. 4.

Figs. 7 and 8 are views somewhat similar to Fig. 6 of certain of the mold operating mechanisms showing successive different positions in the operation of opening a mold; the mold in Fig. 6 being shown closed and in the article forming position; that in Fig. 7, partly open and at an intermediate position, and that in Fig. 8, fully open and at the takeout position as shown in full lines in Figs. 4 and 5;

Fig. 9 is a view in perspective of a sector member for controlling the tilting of the body molds;

Fig. 10 is a fragmentary detail view of the mold and the operating mechanism therefor, shown in Figs. 4 to 9, the view being taken in side elevation as to the closed mold and certain parts being broken away and shown in section;

Fig. 11 is a fragmentary view in transverse vertical section taken substantially on the line 11—11 of Fig. 10;

Fig. 12 is a fragmentary view partly in plan and partly in horizontal section of one of the neck molds, showing the interior construction thereof;

Fig. 13 is a fragmentary detail view as seen from the left in Fig. 1, illustrating the body mold in open or takeout position, the neck mold open and the mouth ring separated therefrom, and certain of the mold operating mechanism;

Figs. 14 and 15 are fragmentary views of the several parts of a mold, showing the sequential steps in the opening thereof, the views being substantially in side elevation;

Fig. 16 is a fragmentary detail view substantially in vertical section on the line 16—16 of Fig. 11, showing the means for locking and unlocking and opening and closing the neck mold;

Fig. 17 is a view similar to Fig. 16, showing the parts in an intermediate position;

Fig. 18 is a view of the same parts in position such that the neck mold is open;

Fig. 19 is a bottom plan view of a neck mold closing member, shown in Figs. 16 to 18;

Fig. 20 is a view in transverse section on the line 20—20 of Fig. 19;

Fig. 21 is a detail view in elevation of a cam and associated means for controlling the vertical movement of the plastic material extrusion chamber and the nozzles associated therewith;

Fig. 22 is an end elevation of the mechanism of Fig. 21 as seen from the right in that figure;

Fig. 23 is a fragmentary detail view principally in plan and taken substantially on the line 23—23 of Fig. 21;

Fig. 24 is a fragmentary detail view principally in bottom plan and taken substantially on the line 24—24 of Fig. 21;

Fig. 25 is an enlarged fragmentary detail view principally in elevation and with parts broken away showing the switch member at the left of Fig. 21 and the operation thereof;

Fig. 26 is a fragmentary detail view partly in vertical section and partly in elevation of a ratchet wheel type of switch usable alternatively with the switch means of Figs. 21 to 25;

Fig. 27 is a fragmentary view in side elevation of the ratchet mechanism of Fig. 26;

Fig. 28 is a fragmentary detail view in front elevation, showing the means for locking the oscillating nozzle supporting structure to the rotary carrier for movement therewith;

Fig. 29 is a view principally in side elevation of the structure shown in Fig. 28 as seen from the right in that figure;

Figs. 30 and 31 are fragmentary detail views substantially in horizontal section and taken on the lines 30—30 and 31—31 respectively of Fig. 29;

Fig. 32 is a fragmentary view principally in front elevation and with certain parts broken away and in vertical section and other related parts shown in dot and dash lines, illustrating the nozzles and certain of the means for handling the plastic material and forcing it therethrough;

Fig. 32a is an extension of an adjacent part of Fig. 32 which is broken off and shown separately in view of space requirements on the sheet;

Fig. 33 is a view principally in plan, but with parts broken away and in horizontal section, of the mechanism of Fig. 32, illustrating particularly the means for operating the valves controlling the flow of plastic material into and out of the receiving chamber ;

Figs. 34 and 34a are lower and upper portions respectively of a view showing partly in end elevation and partly broken away and in vertical section the mechanism of Figs. 32 and 33 as seen from the left in those views;

Fig. 35 is a fragmentary view in section taken substantially on the line 35—35 of Fig. 34 and illustrating the valve for controlling the flow of plastic material into the measuring chamber;

Figs. 36 and 36a are views showing in open and closed positions respectively and substantially in horizontal section on the line 36—36 of Fig. 34, a valve for controlling the flow of plastic material from the measuring chamber to a nozzle;

Figs. 37 and 38 are views substantially in front elevation and plan respectively of the means for supplying fluid pressure to the nozzles and also showing the pressure controlling valves;

Fig. 39 is a view of one of the pressure controlling valves and the cam controlling means therefor, the view being substantially in side elevation, but at right angles to the position of the parts shown in Fig. 40 in view of space requirements;

Fig. 40 is a fragmentary view in side elevation showing in full lines one of the pressure controlling valves for the nozzles and the cam controlling means therefor and in dot and dash lines the relationship of other parts of the machine;

Fig. 41 is a bottom plan view of one of the banks of valves for controlling the flow of fluid pressure to and from the nozzles;

Fig. 42 is a view of the same valves, substantially in horizontal section on the line 42—42 of Fig. 37;

Fig. 43 is a detail view substantially in vertical section on the line 43—43 of Fig. 38, showing one of the valves and the operating means therefor;

Fig. 44 is a view substantially in a vertical section on the line 44—44 of Fig. 38, showing the construction and operation of the valves of this group;

Figs. 45, 46 and 47 are fragmentary views substantially in end elevation showing the operation of the several valves;

Fig. 48 is a view in side elevation of the valves controlling the cutting off of pressure to the nozzles during the return or idle oscillatory stroke thereof;

Fig. 49 is a view partly in plan and partly in horizontal section of the valves of Fig. 48 showing the construction thereof;

Figs. 50 and 51 are fragmentary views in side elevation on the line 50—50 of Fig. 48, illustrating one of the valves in open and closed positions respectively;

Figs. 52 and 53 are diagrammatic views substantially in transverse vertical section illustrating the forming of an article according to a process wherein the nozzle is introduced a substantial distance into the mold until the lower end thereof approaches the lower end of the mold;

Fig. 54 is a fragmentary detail view in perspective and with parts broken away and in section showing the mouth ring with a separate nipple threaded therein to assist in forming the neck on an article and in severing it from the plastic material within the nozzle;

Figs. 55, 56, 57 and 58 are a series of diagrammatic figures, all substantially in central vertical section, showing various steps in the process of forming an article by extruding a closed-ended hollow body of plastic material from the nozzle into the mold and expanding this body in the mold while the nozzle is gradually withdrawn therefrom;

Fig. 59 is an enlarged fragmentary detail view substantially in central vertical section, illustrating the parting or severance of the plastic material forming an article from that within the nozzle;

Fig. 60 is a view substantially in side elevation illustrating a takeout mechanism for removing bottles from the body portions of the molds of the machine shown in the previous figures;

Fig. 61 is a view substantially in plan of the device of Fig. 60;

Fig. 62 is a view principally in side elevation of the device of Fig. 60, certain parts being omitted for clearness, showing bottle reaming means associated with the takeout device;

Fig. 63 is a fragmentary view substantially in side elevation of a drive mechanism which may be used to drive the takeout and reaming device of Fig. 60 from the forming machine of the previous figures;

Fig. 64 is a fragmentary view substantially in plan of the parts shown in Fig. 63;

Fig. 65 is a fragmentary detail view taken substantially on the line 65—65 of Fig. 63 showing the common drive shaft and certain related parts in end elevation;

Figs. 66, 67 and 68 are views from different sides of the takeout means of Figs. 60 and 61 and showing the tongs or bottle gripping means and the mechanism by which this means is operated to grasp the bottles or other articles resiliently;

Figs. 69 and 70 are fragmentary detail views in elevation and plan respectively of the cam means for opening the bottle gripping means to release articles held therein, the latter being a view as seen from the line 70—70 of Fig. 62;

Fig. 71 is a fragmentary detail view principally in elevation and with parts broken away showing the construction and operation of the reaming means associated with the takeout device.

Fig. 72 is a view principally in transverse radial section showing the reaming means of Fig. 71, certain parts being illustrated as seen substantially on the line 72—72 of Fig. 71;

Fig. 73 is an enlarged fragmentary detail view principally in transverse section, showing one of the rotating reaming or neck finishing devices and its mounting; and Fig. 74 is a view in transverse section on the line 74—74 of Fig. 73.

The apparatus of the present invention may be used in conjunction with many different types of materials. In fact, the only limitation which need be placed upon the present invention from the point of view of the type of material is that the material be workable by the apparatus disclosed. The appended claims are to be construed accordingly. Many of the claims recite the material to be worked on as organic plastic material which may be expanded by blowing and is thereafter capable of being rigidified. This is intended to include both thermoplastic and thermosetting types of materials and/or mixtures thereof with each other or with other material, such as plasticizers, fillers, resins, high and/or low boiling solvents, etc. Certain subject matter, including for example the means for opening and closing and moving the molds hereinafter described, is adapted to be used with many other types of plastic materials, some of which are of inorganic nature, for example, glass.

Furthermore, the term "blowing" is used hereinafter and in the claims to designate the expansion of hollow articles by the internal application of fluid pressure thereto. This term is to be construed broadly to include both gaseous and liquid pressure. The intended scope of other expressions will be brought out throughout the specification and will be apparent from the appended claims.

While there is shown for purposes of illustration of the present invention a rotary type machine wherein a mold carrier is arranged for rotation about a horizontal axis, many, if not all, of the principles of the present invention may be employed in rotary type machines, whether intermittently or continuously rotated, and wherein the mold carriers are pivoted about vertical or otherwise disposed axes.

Furthermore, there is illustrated in the present case a continuously rotating machine in which a single set of extrusion nozzles operates in conjunction with the machine by oscillating to move with each set of molds in succession and thereafter to return to cooperate with the next set of molds. However, if desired, an extrusion nozzle may be provided for each mold and arranged to move therewith in the rotation of the mold carrier. These and other alternatives fairly coming within the scope of the appended claims are to be considered as included in the present invention.

GENERAL ARRANGEMENTS

Figure 2:
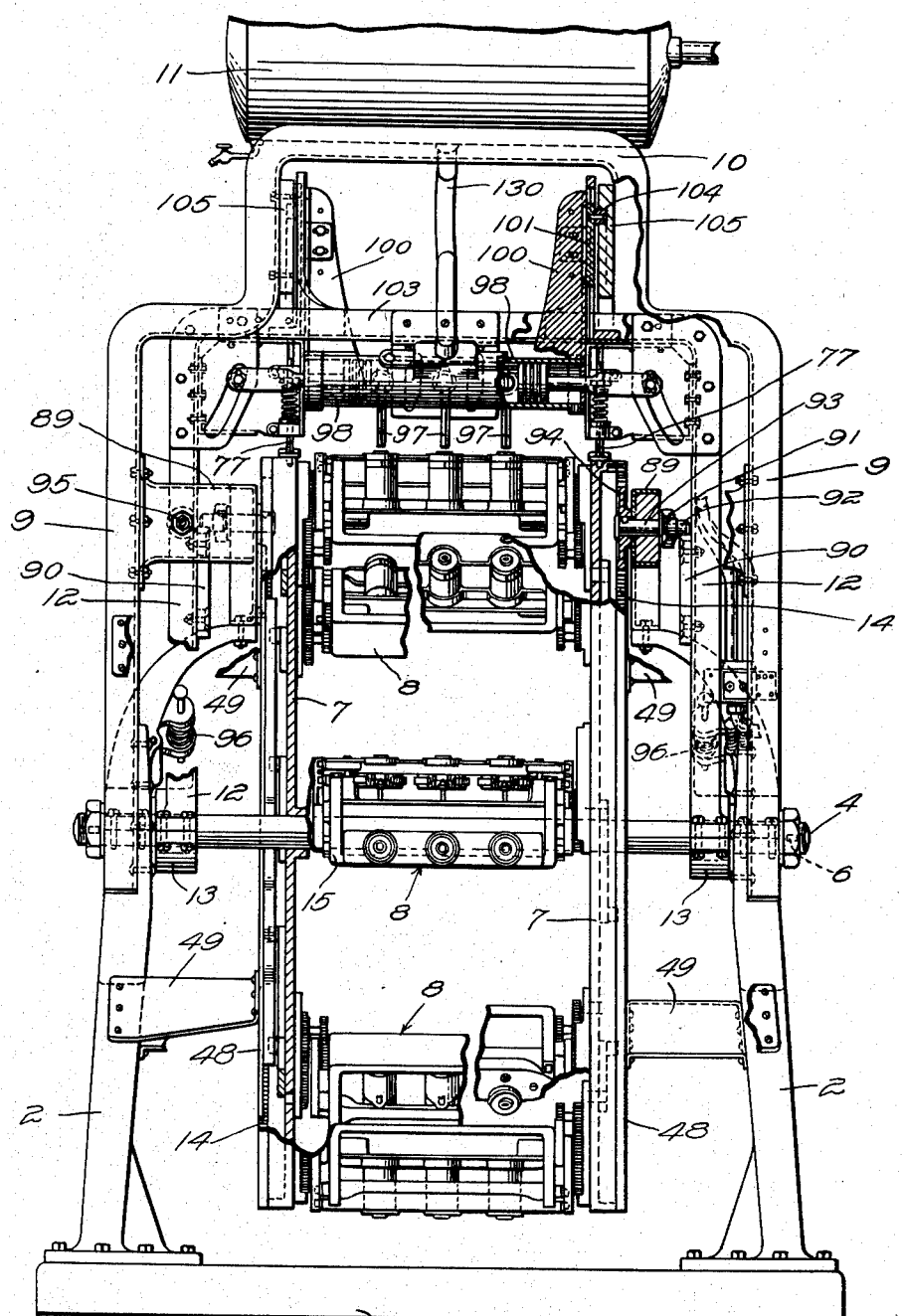
Fig. 2 is a view principally in side elevation as seen from the left, Fig. 1, but with certain parts broken away and in vertical section, showing substantially the entire forming machine.

Referring now to the accompanying drawings and particularly Figs. 1, 2 and 3 thereof, the machine chosen for illustration in the present application comprises a base 1 supporting a pair of similar side frame members 2. The members 2 are provided with suitable bearings 3, Fig. 3, in which is mounted a transverse shaft 4. The shaft 4 may be stationary and provided at its ends with suitable nuts 5 threaded on the shaft 4 and secured in a fixed position thereon by key members 6, Fig. 3.

On the shaft 4 is pivoted a main rotatable carrier comprising a pair of disk-like members 7 which are secured together as hereinafter set forth and are arranged for free rotary movement about the shaft 4. Carried by the rotary carrier comprising the disk members 7 are a plurality of groups of molds 8, each group in the present instance comprising three molds, the several mold groups serving to tie together the disk-like members 7.

Supported by the side frame members 2 are upwardly extending bracket members 9 which may be connected together at their upper ends, as shown at 10, Fig. 2, this connection as shown supporting a supply chamber for plastic material, here illustrated as a double-walled tank 11. Plastic material of any suitable nature may be contained within the tank 11 and may be maintained therein at a desired temperature as by means of a temperature controlling fluid flowing through the space between the double walls of the tank 11, Fig. 1.

Also arranged for rotation about the axis of the shaft 4 is a nozzle supporting structure or yoke member 12, which is generally U-shaped and is arranged with bearing portions 13 embracing the shaft 4. The structure 12 carries a plastic material measuring chamber shown in Figs. 32 and 33 and also carries a series of extrusion nozzles, similar in number and arrangement to the number and arrangement of the molds in each mold group 8 and arranged to cooperate successively with each group of molds during a time the mold carrier and the yoke 12 are locked together, as hereinafter set forth, the yoke 12 returning after a predetermined period of movement with the mold carrier to cooperate with the next succeeding group of molds.

All the operations of the apparatus are coordinated in proper sequence and all are driven from the rotation of the mold carrier. The drive for the mold carrier is not illustrated herein, but may be of any conventional type. As shown, Figs. 1, 2, 60 and 63 to 65, the edge portions of the disks 7 are provided with outwardly turned flange portions, best shown in Fig. 64, these portions carrying large gear rings 14 having teeth directed both inwardly and peripherally. Any suitable driving means may be provided meshing with the teeth of the gear rings 14. Preferably this drive should cooperate with the gear rings associated with both the disk members 7, so as to have a uniform drive without putting undue strain on the parts connecting the disks 7, as hereinafter set forth.

The several phases of the machine and their construction and operation will be taken up hereinafter in separate sections.

Mold construction, mounting and operation

While three molds are shown in each mold group 8, it is contemplated that any number, including one, of such molds may be provided for each group and operate in the same way, the only difference being as to the width of the machine or the axial dimension of the mold carrier including the disk members 7.

Each mold group 8 is mounted in a transversely extending mold carrying member or bracket 15, Figs. 4 to 13 inclusive. This bracket is pivotally connected at its opposite ends with the disk members 7 of the rotary carrier and serves to connect these two disk members. For this purpose the member 15 is provided with pintle portions 16 journaled in the disk members 7, Figs. 5 and 10.

Turning now to Figs. 14 and 15, wherein the molds are shown in side elevation and to Figs. 55 to 58 showing the molds in central vertical section, each mold comprises a substantially unitary or one-part body mold portion 17, a split or partible neck mold 18 and a substantially unitary mouth ring 19. The body mold portions 17 of the molds of each group 8 are mounted on a common transversely extending supporting bar 20, Figs. 10 to 13. At its ends the bar 20 is provided with laterally extending bracket portions 21, each of which carries rigid therewith a pin 22 journaled in upstanding end portions 23 of the supporting bracket 15. The axes of the pins 22 are aligned and parallel with that of the pintles 16. The neck molds 18 are formed in split, mating or complementary portions, best shown in Fig. 12, and are pivoted at 24 to a transverse neck mold carrying bar 25, the ends of which are formed with slide members 26, Fig. 5, which are received in grooves in the upstanding portions 23 of the bracket 15. The neck molds are thus mounted for opening and closing movement and in addition for a sliding movement in a direction axial of the mold at the closed position thereof, as seen in Fig. 11.

The mouth rings 19 are all mounted on a common transverse supporting bar 27, which is provided at suitable points, as adjacent to the ends thereof, with bosses 28 in each of which is secured a guide rod 29 extending into a suitable bore formed in a part of the bar 25 parallel with the guides 26 and with the longitudinal axis of the mold when closed. Thus, the mouth rings are mounted for sliding movement in a direction axial of the mold with and with respect to the neck molds.

During the forming of an article in each mold and for the major portion of the rotation of the mold carrier, the molds are closed and are positioned as shown for example in Figs. 1, 10 and 11, so that the molds and their brackets 15 are substantially radially disposed in respect to the mold carrier with the neck openings of the molds outermost. As the molds approach the takeout position, which is at the left side of Fig. 1 about half way up, the several mold parts just described are moved so as to open the molds to leave the completed articles in the body portions 17 thereof and to present the articles neck outermost. Thus the neck portions of the articles are easily accessible for removal from the molds by any suitable means, as that shown in Figs. 60 to 74 inclusive. Many different types of mechanisms could be provided for operating the mold parts in the several ways hereinafter set forth to effect the desired results. The mechanism shown in the drawings by way of illustration will now be described.

As shown in Figs. 4 to 10 inclusive, a mechanism is provided for controlling the several mold movements in response to the rotation of the carrier from a single stationary cam shown in Fig. 1 and hereinafter described, the same mechanism here shown being provided at each end of the mold carrier bracket 15, although one of these mechanisms may be dispensed with in case of relatively narrow mold carriers. However, inasmuch as these mechanisms are substantial duplicates of each other, only one will be described.

In moving from the forming position to the takeout position, one operation is to rotate the brackets 15 with respect to the mold carrier from a substantially radial position, Figs. 1, 6 and 10, to a substantially tangential position, Figs. 4, 5, 8 and 13, in the present case the rotation being approximately 90° clockwise, as seen in Fig. 1. For this purpose, means are provided for effecting the rotation of the brackets 15 in response to the continuous rotation of the mold carrier and particularly in response to a stationary cam.

The mold carrier 15 is provided with a curved rack 30 secured thereto in any suitable manner, as by bolts 31, Fig. 4. The rack 30 is concentric with the axis of the pintle 16. Meshing with the rack 30 is a pinion 32, Fig. 5, mounted on a short shaft 33 which is secured in the disk 7. Also mounted on the shaft 33 and secured to the pinion 32 by a sleeve 34 is a pinion 35. Meshing with the pinion 35 is an intermediate gear 36 rotatable about a shaft 37 secured in the disk 7; and meshing with the gear 36 is another intermediate gear 38 rotatable about a shaft 39, also secured in the disk 7. The gear 38 meshes with a gear 40, which is mounted on a sleeve 41 concentric with the pintle 16. The gear 40 also meshes with the internally directed teeth of a rack 42 forming a part of a frame member 43 which is secured to a shaft 44 journaled in the disk 7. On the opposite side of the disk 7 the shaft 44 has secured thereto a crank arm 45 carrying at its outer end a cam roller 46, which is arranged to move in a closed cam track 47, Figs. 1 and 4 to 13 inclusive. The cam track 47 is formed on a plate 48 which is carried by brackets 49, Fig. 2, from the supports 2 of the machine.

Thus, the shape of the cam track 47 will be effective through the mechanism described to rotate the mold support 15 between the position shown in Figs. 6 and 10 wherein the mold support and mold extend radially outwardly of the carrier and the position shown in Figs. 4, 5 and 8 wherein the mold support extends substantially tangential to the carrier, having been rotated through an angle of approximately 90° in a clockwise direction, as seen at the left in Fig. 1.

During the rotation aforesaid of the mold supporting bracket 15, it is the purpose of the present mechanism to open the mold and eventually to present the neck portion of an article substantially radially outwardly free of the neck mold and mouth ring. To open the neck mold, it is necessary that the mouth ring 19 and body mold 17 be relatively moved in respect to the neck mold 18 in an axial direction. As shown in Figs. 14 and 15, the neck mold has a depending flange 50 which enters a corresponding recess in the body mold 17 and an upper flange 51, which in the closed position of the mold, Figs. 55 to 58, enters into a corresponding recess in the mouth ring 19. In order to free these parts to permit the opening of the neck mold, the neck mold 18 and the mouth ring 19 are first moved simultaneously and bodily with respect to the body mold portion 17 in an axial direction, Fig. 14. Subsequent to this, the mouth ring is given a further axial movement in respect to the neck mold, as shown in Fig. 15, to free the flange 51 of the neck mold from the mouth ring. Thereafter the neck mold is opened, in the present instance in response to the relative movement apart of the neck mold and mouth ring, and by mechanism hereinafter to be described. The means for producing these relative axial movements will first be described.

At their ends the bars 25 and 27 which carry the neck mold and mouth ring respectively are provided with cam rolls 52 and 53. These cam rolls operate respectively in closed cam tracks 54 and 55 of a cam member generally indicated at 56. The cam member 56 is secured to a sleeve 57 concentric with the pin 16 and the sleeve 41 and secured to the latter by a key 57a, Figs. 6, 7 and 8. The sleeves 41 and 57 are freely rotatable about the pin 16.

Thus, the cam member 56 is rotated by the gear 40 in response to the shape of the cam track 47, but due to the ratio between the diameters of gears 40 and 35 on the one hand and the pinion 32 and the rack 30 on the other, the cam member 56 will be given a greater angular movement than will the mold support 15 for a given movement of the cam roll 46. The movement of the cam 56 is substantially from the position shown in Fig. 6 through that shown in Fig. 7 to that shown in Fig. 8. The differential movement between the cam member 56 and the mold support 15 is utilized to effect the axial movement of the neck molds and mouth rings, as will be seen from a consideration of Figs. 6, 7 and 8. From the initial position of the parts shown in Fig. 6 to a time when the cam rolls 52 and 53 are substantially at the position A, Fig. 7, in respect to the cam member 56, the neck mold and mouth ring move axially to about the position shown in Fig. 14. Thereafter the neck mold is moved very little in respect to the mold carrier 15 as the roller 52 comes into a substantially constant radius portion of the cam track 54. However, the roller 53 moves through a constantly increasing radius portion of the cam track 55 and thus causes a separation of the neck mold and mouth ring from the position of the parts shown in Fig. 14 to that shown in Fig. 15. Subsequent to this, the further axial movement of the mouth ring away from the neck mold is utilized to open the neck mold by mechanism presently to be described.

As best shown in Fig. 11, the bar 27 carrying the mouth rings 19 has secured therein a sleeve member 57b on which the arms 58 of the neck mold 18 are pivoted, as shown in Fig. 12. The sleeve 57b extends through a pair of webs or projections 59 and 60 of the bar 25 and is centered and guided thereby. Centrally of this sleeve 57b is a hollow sleeve or tube 61 which may also be secured in the bar 27 and closed at its upper end for a purpose hereinafter to be described. This sleeve 61 passes through a lower web 62 of the bar 25 and may serve to conduct temperature controlling media away from the molds as hereinafter set forth. At its lower end the sleeve 57b carries a laterally extending bracket portion 63 having thereon a wedge member 64, Figs. 11 and 16 to 18, for cooperation with suitably shaped recesses 65 formed in the arms 58 of the neck mold. Thus, when the mouth ring is separated from the neck mold, as seen from a comparison of Figs. 14 and 15, the wedge 64 will be moved upwardly in respect to the neck mold arms 58, causing the separation of the neck mold arms and the opening of the neck mold, as seen in Figs. 16 to 18.

Means are provided for holding the neck mold portions locked during the forming of an article in the mold and for closing and locking the neck mold portions after they have been opened. For this purpose the substantially horizontal web portion 66 of the bar 27 carrying the mouth rings has secured thereto a somewhat arcuate cam member 67 having wedging and locking portions 68, as shown in Figs. 16 to 20 inclusive. The member 67 may be secured to the web 66 in any suitable manner, as for example by bolts 69 passing through elongate slots 70 in the member 67 to permit of a desired adjustment of the parts.

As seen in Figs. 16 to 18, when the member 67 is at its lowermost position in respect to the neck mold arms 58, the upper portions of these arms are located between substantially parallel faces of the member 67, thus locking the arms 58 together and holding the neck mold closed and locked. When the neck mold and mouth ring have been moved apart to a certain extent as shown in Fig. 17, the parallel faces of the member 67 are above the neck mold arms 58, unlocking them, and the wedge 64 is just ready to force the neck mold arms apart to open the neck mold. In Fig. 18, the bar 27 has been moved to its uppermost position, moving the member 67 wholly away from the neck mold arms 58 and permitting them to be separated by the wedge 64. On the reverse movement of the parts, the wedge 64 is moved out from between the neck mold arms 58, permitting them to be closed together by the inclined faces 68 of the member 67 until the parts reach the position shown in Fig. 17, after which the neck mold arms are locked together by being confined between the substantially parallel faces of the members 67, as shown in Fig. 16.

After the mold portions 17, 18 and 19 have been separated as shown in Fig. 15 and the portions of the neck mold 18 have been opened by the means illustrated in Figs. 11, 12 and 16 to 20, in response to the shape of cam tracks 54 and 55, the bottle is free from the neck mold and the mouth ring, so that the body mold portion 17 may now be rotated in respect to the mold carrier bracket 15. This occurs between the positions of the parts shown in Figs. 7 and 8 and is controlled by a cam carried by the cam member 56.

For this purpose the pins 22, which are secured to the bars 20 carrying the body mold portions 17, have secured to their outer ends sector members 71, shown in detail in Fig. 9, the pins 22 being suitably secured in apertures indicated at 72 in that figure. The sector members 71 are provided with a pair of locking cam rollers 73, which up to this time in the cycle have been in rolling contact with a cylindrical surface 74 secured to the cam member 56, as shown in Fig. 6. The engagement of the two rolls 73 with the cylindrical surface 74 prevents pivotal movement of the body mold portions 17 with respect to the mold carrier 15 until the neck molds and mouth rings have separated so as to open the neck molds and to free the neck portion of a bottle. These events occur, as above set forth, during the movement of the parts from the position shown in Fig. 6 to that shown in Fig. 7. When the parts have reached the position shown in Fig. 7, a pin 75 also carried by the sector 71 and in alignment with one of the rollers 73 has entered and passed through a portion of a closed cam track 76 secured to the cam member 56 and concentric therewith. This concentric cam portion prevents rotation of the sector 71 and hence tilting of the body mold portions 17 even after one of the rollers 73 has passed beyond the surface 74 due to the relative rotation of the parts as shown in Fig. 7. During the movement of the parts from the position shown in Fig. 7 to that shown in Fig. 8, the pin 75 traverses another section of the closed cam track 76, causing a rotation of the sector 71 and hence of the bars 20 and the body mold portions 17 to move them to the position shown in Fig. 8, which is the takeout position as shown at the left in Fig. 1.

It will be understood that in moving from the takeout position back to the forming position, the several parts go through the same sequence of operations in the reverse order and are operated by the same mechanisms, all in response to the rotation of the mold carrier and due to the shape of the cam track 47.

*Oscillating structure carrying extrusion nozzles, mounting and movement thereof*

In the present machine a series of extrusion nozzles corresponding in number and position to the number and position of the molds of a single group 8 are provided and arranged to move with these molds during the forming of an article therein. For this purpose, there is provided an oscillating structure including the yoke member 12 pivoted for oscillation about the shaft 4 for carrying the nozzles and associated means. Means are provided for locking the yoke 12 to the mold carrier for a selected movement during which an article is formed in the molds of one group and then for unlocking the yoke from the mold carrier and for returning it to its initial position to cooperate with a next succeeding group of molds.

The locking means is best shown in Figs. 1 and 3 and 28 to 31 both inclusive and comprise two pins 77, one of which may be provided on each side of the yoke 12, the pins 77 being arranged to enter two series of spaced apertures in the peripheries of the disks 7, as shown best in Fig. 2. Each pin 77 is mounted for vertical sliding movement in a pair of brackets 78 and has its upper end bent at a right angle, as shown at 79, and passing through a slot 80 in a plate 81, by which the brackets 78 are carried and which is secured to the yoke 12 as shown. Each pin 77 is urged downwardly by a compression spring 82 extending between a lower cup 83, which is prevented from downward movement on the pin 77 by a transverse pin 84, and an upper cup 85 bearing against the underside of the upper bearing bracket 78. The spring 82 thus urges the pin 77 downwardly at all times so as to seat it in one of the recesses in the periphery of the disk 7 whenever such recess is in alignment therewith.

Adjacent to the end of the path of travel of the yoke member 12 while locked to the mold carrier is a means, here shown as a forked cam member 86, Figs. 1 and 3, for unlocking the yoke from the mold carrier. This forked cam 86 is arranged to engage beneath a flange 87 secured to or formed on the stem of the pin 77 just above the lower end thereof to move the pin upwardly against the action of the compression spring 82. In order to permit of the smooth engagement of the parts, the flange 87 is provided at its right hand side, as seen in Fig. 29, with an upwardly curved portion 88 which first engages the cam 86. Rotation of the pin 77 to permit the displacement of the portion 88 is prevented by the curved or bent portion 79 of the pin passing through the slot 80 as aforesaid. The cam 86 is adjustably secured to a stationary bracket 89 which is substantially U-shaped in plan and is secured at its left-hand open ends, as seen in Fig. 1, to the vertical bracket members 9 and also to one arm of each of the supporting structures 2 on each side of the machine.

The foregoing means will thus provide for the locking of the yoke member 12 and parts carried thereby to the continuously rotating mold carrier and for the unlocking of the same to permit of its return movement at substantially the position of these parts shown in dotted lines in Fig. 1.

Means are also provided for returning the yoke member 12 to its initial position. For this purpose, each of the upstanding leg portions of the yoke member is provided with an abutment plate 90, Figs. 1, 2 and 3, and a crank means is provided for periodically engaging this plate to return the yoke member from the dotted line to the full line positions as seen in Fig. 1. Inasmuch as similar mechanisms of this kind are provided on the two sides of the yoke member and as they operate in the same manner, only one will be described.

A crank 91 carries a roller 92 for engagement with the right hand face of the abutment 90, as seen in Fig. 1. The crank 91 is secured to a short transverse shaft 93, which is journaled in a portion of the bracket 89, the shaft carrying at its inner end a gear 94 in mesh with the inwardly directed gear teeth of the gear ring 14. The parts are so related to one another that the shaft 93 makes a single complete revolution for each complete oscillation of the yoke 12, or in other words, eight revolutions for each revolution of the mold carrier, there being eight mold groups on the mold carrier. The crank 91 is so located on the shaft 93 and of such length that the roller 92 will engage the abutment 90 only at the desired times for returning the yoke to its initial position (shown in full lines in Fig. 1); the rest of the time the roller 92 is idle and not in contact with any portion of the yoke 12.

Suitable resilient bumper members are provided for cushioning the movement of the yoke 12 in opposite directions. Such means are shown generally at 95 and 96, Fig. 1, for cushioning the movement at the left and right respectively. In general, each of these means comprises a conventional bumper secured to the end of a slide rod, which is provided with a compression spring, to oppose the engagement of the yoke therewith, and with a suitable means to retain the parts in assembled relation and prevent the compression of the spring from dislodging the parts. Inasmuch as such bumper means are conventional in character and the construction and operation thereof may be ascertained adequately from the drawings, no further description thereof will be given herein.

*Extrusion nozzles—movements thereof longitudinally of the molds*

As there are three aligned molds in each mold group 8 in the device of the accompanying drawings, there are also provided three correspondingly arranged extrusion nozzles 97. These nozzles are secured to the side of a plastic material measuring chamber 98, as shown in Figs. 32, 33, 52 and 53, through valve chambers 99. In order that the extrusion nozzles may be introduced into the molds, as shown by a comparison of Figs. 52 and 53 for example, means are provided for supporting the nozzles so as to be movable toward and from the path of the molds during their movement therewith, i. e., during the time the yoke 12 is locked to the mold carrier by the pins 77. For this purpose, the chamber 98 is provided at its ends with upwardly extending bracket portions 100 to which are secured slide members 101 mounted in slideways formed in upwardly extending guide portions 102 secured to the transverse horizontal portion 103 of the yoke 12. Thus, the nozzles 97 are slidable in a direction radial of the mold carrier, so that they may project into the molds, as shown in Fig. 53, at the desired times.

Means are provided for moving the nozzles in a direction radial of the mold carrier, comprising stationary cams and cam rollers 104 carried by the slide members 101. As these means are similar on opposite sides of the apparatus, but one will be described. I prefer to employ a cam having two paths joined at their ends, but spaced at the portions intermediate such ends and to use suitable switching means to insure that the rollers 104 travel along one of said paths during the movement of the yoke 12 in one direction and along the other of said paths during the return movement thereof. In this way I am enabled to cause the movement of the nozzle members downwardly into the holds or into contact therewith in a desired manner during the period that the nozzle members are moving with the mold carrier and in registry with a set of molds thereon, while preventing movement of the nozzle members toward the path of the molds during the return movement of the yoke 12.

As shown, Figs. 1, 2 and 21 to 25 inclusive, there is provided a cam plate 105 having a cam track of the kind described for the reception of the cam roller 104, Figs. 32a and 33. The cam plate 105 is secured between a portion of the vertical standard 9 and a bracket 106, Fig. 1, connected to the bracket 89. Also, as shown, there are two similar cam plates 105 and associated mechanisms, but due to their similarity, only one will be described.

The cam track for the cam roller 104 is shown in dotted lines in Fig. 1, and in full lines in Fig. 21. This track comprises an upper arcuate path 107 and a lower path 108, which is shaped in a predetermined manner. The cam roller 104 moves through the lower passage 108 during the operative movement of oscillation of the yoke 12 causing the downward movement of the nozzles 97 into the molds at the lowermost point of the path 108; while on the return movement or inoperative movement of the yoke, the nozzles will be maintained out of contact with the molds and in a position so as not to be engaged thereby.

Means are provided for insuring that as the cam roller 104 reaches the juncture of the paths 107 and 108 at each end after moving through one of these paths, it will return through the other of these paths. I have shown in Figs. 21 to 25 inclusive a spring-controlled switch means for effecting this purpose, and in Figs. 26 and 27 a ratchet type of switch means for the same purpose. Either or both of these means may be employed as may be desired.

Referring first to Figs. 21 to 25, the switch at the left, as seen in Fig. 21, and also in Figs. 23 and 25, comprises a switch member 109 which is pivoted at 110 to the plate 105. This member has a pin 111 parallel to its axis and passing through an arcuate slot 112 in the wall of the plate 105. A tension spring 113 extends between the rear end of the pin 111 and a bracket 114 secured by screws 115 or otherwise to the plate 105.

As shown in Figs. 21, 22 and 24, an essentially similar construction may be provided at the other juncture of the cam paths 107 and 108. This construction includes a switch member 116 pivoted on a pin 117 to the cam plate 105 and having a pin 118 passing through an arcuate slot 119 and engaged by one end of a tension spring 120, the other end of which is secured to a bracket 121, which is in turn secured to the cam plate 105.

Reference is now made to Figs. 26 and 27, which are shown as applied to a cam plate 105' similar to the cam plate 105 and provided with cam tracks 107' and 108' corresponding respectively to the similarly numbered cam tracks of Figs. 21 to 25. Adjacent to the juncture of the cam paths 107' and 108' is mounted a sprocket wheel 122, which is formed with peculiarly shaped teeth to have the effect of a switch. This wheel is mounted rigidly upon a shaft 123, which is journaled in a projection 124 of the plate 105', so that the wheel 122 lies in the plane of the cam plate 105' and of the cam paths 107' and 108'. At its rear end the shaft 123 carries a ratchet wheel 125 secured thereto and engaged by a conventional type of pawl 126 pivoted at 127 to the projection 124 of the cam plate 105' and urged toward the ratchet wheel 125 by a tension spring 128 extending between the pawl and a suitable anchorage 129 on the cam plate 105'.

The pawl and ratchet arrangement 125 and 126 serves two purposes; first, to prevent too easy rotation of the wheel 122 due to the additional friction thereof, and, second, to prevent reverse rotation of the wheel 122. Thus, when the cam roller 104 arrives at position B, Fig. 27, it engages one of the teeth of the wheel 122; and in moving from position B to position C, rotates the wheel 122 through a certain predetermined arc. The position C is the farthest point of movement of the cam roller 104 to the left, as seen in Fig. 27. Thus, on return movement of the cam roller 104 from left to right, as seen in that figure, incident to the start of the movement of the nozzles with the mold carrier, the cam roller 104 must now move into the active path 108'.

It will be seen that a corresponding construction could be used at the opposite ends of the paths 107' and 108', and also, if desired, a switch means, as shown in Figs. 21 and 25, could be used at one end and a sprocket wheel device as shown in Figs. 26 and 27 at the other end of the juncture of the two cam paths. All such constructions are to be considered as within the purview of this invention.

*The plastic material supply and control thereof*

As above generally set forth, the plastic material is supplied from a main supply tank 11 and passes thence through a flexible tube 130, Figs. 1, 2 and 32 to 34. The pipe 130 leads to a valve chamber 131 and thence into the center portion of the measuring chamber 98. The valve chamber 131 is arranged for a slide type of valve, comprising a movable slide member 132 having apertures 133 therein adapted in one position thereof to register with a series of apertures 134 in a stationary plate within the chamber 131, the sectional view in Fig. 35 indicating the open and closed positions of these two series of apertures by the appropriate legends.

Means are provided for opening and closing the valve in the chamber 131 and thereby controlling the flow of plastic material into the measuring and compression chamber 98. For this purpose, the slide member 132 of the valve is secured at its opposite ends to extensions 135 of a slide plate 136, which is mounted for horizontal sliding movement on suitable brackets above the chamber 98. The plate 136 is provided with a pair of elongate openings or slots 137 through which pass studs 138 secured in suitable portions of the structure of the chamber 98. The slots 137 thus act as guides for controlling the direction and the limits of movement of the slide plate 136. The slide plate 136 further has a pair of depending brackets 139 on which are mounted substantially horizontally disposed cam rollers 140. The cam rollers 140 are arranged to operate in cam openings 141, Fig. 32, each of which is shaped generally as a parallelogram, and which are formed in a pair of cam plates 142 depending from the transverse portion 103 of the yoke 12 and rigid therewith.

The arrangement is such that as the nozzles 97 are moved downwardly toward the path of the molds under control of the cam track 108 acting on cam rollers 104, the cam rollers 140 move downwardly in the apertures 141. Toward the end of this movement, the cam rollers 140 engage inclined portions of the apertures 141, forcing the cam plate 136 from left to right, as seen in Figs. 32 and 33, and causing the closing of the valve 131 controlling the inlet of plastic material to the measuring chamber 98. During the upward movement of the nozzle out of the mold and subsequent to the substantial completion of the formation of an article and to the completion of the extrusion of plastic material from the chamber 98 through the nozzles, the cam rollers 140 engage the upper inclined boundaries of the apertures 141 to open the valve 131.

The measuring chamber 98 acts not only to predetermine the amount of plastic material supplied through the nozzles in the making of a group of articles in one of the sets of molds 8, but also serves to supply the force effective on the plastic material to extrude it through the nozzles. In this way it acts as a pump provided with alternately operating inlet and outlet valves, the inlet valve being that within the chamber 131 just described. As shown, the chamber 98 has a cylindrical interior cavity 143 in which is disposed a pair of pistons 144. Each of these pistons has a piston rod 145 extending through one end of the cylinder. As each is similar to the other, the operation of only one will be described. The piston rod 145 is bifurcated at its outer end and carries a roller 146 freely mounted on a pin 147 extending between the bifurcated end portions of the piston rod 145. The bifurcated portions of the piston rod also straddle a cam plate 148 secured in the upper corner of the yoke 12 where the vertical leg thereof joins the transverse portion 103, the roller 146 being disposed in a suitably shaped cam slot 149 formed in the plate 148.

Thus the vertical movements of the nozzles under control of the cam track 108 are effective to control the reciprocatory movements of the pistons 144 in causing the filling and emptying of the measuring chamber 98. The retractive movements are employed in this case to assist in the filling thereof by forming a partial vacuum and drawing the plastic material into the measuring chamber from the tank 11; while the inward movements of these pistons is employed to supply the force effective on the plastic material to extrude it from the nozzles 97 at a pressure independent of any pressure effective thereon during its preparation for use.

Again, considering the measuring chamber 98 as a pump which is provided with inlet and outlet valves, the inlet valve being in the chamber 131 and the outlet valves being in the chambers 99, there is provided an automatic means for controlling these outlet valves. These valves are individual to each nozzle and shown as of the butterfly type, including a valve member 150, Figs. 34 and 36, secured to a rotatable valve stem 151, each of which carries at its upper end a pinion 152. The pinions 152 are in mesh with rack sections 153, all mounted on the slide plate 136.

The arrangement is such that when the slide plate 136 moves in one direction, it is effective to close the inlet valve 131 for plastic material to the measuring chamber 98 and open the outlet valves 150 thereof; while movement in the other direction effects a reverse control of these valves.

Thus, the operations of the several valves controlling the flow of plastic material, and the movements of the pistons 144 for causing this flow, are all controlled by the vertical movements of the nozzles 97, which in turn is controlled by the shape of the cam path 108, as previously described.

*Fluid pressure control to extrusion nozzles*

Means are provided for selectively supplying to the extrusion nozzles a fluid, in this case air, under pressure, vacuum, or atmospheric pressure. For this purpose pressure and vacuum are conducted to the apparatus herein disclosed from suitable sources through passages or tubes 154 and 155 respectively, Fig. 1. These passages communicate with valve chambers 156 for super-atmospheric pressure and 157 for vacuum, these chambers being disposed in a housing secured to one side of the yoke 12, as shown in Figs. 1, 48 and 49. The valves in the chambers 156 and 157 are so arranged as to cut off flow of pressure therethrough during the return movement of the yoke member 12, that is, during the time the nozzles are not in cooperation with any of the molds. The control of the several pressures to the nozzles during their active travel with the molds is effected by another set of valves hereinafter to be described.

The valves 156 and 157 are each similar to the other so that only one will be described. Each of these valves comprises a movable member 158 arranged in sliding relation to the valve housing, as shown in Figs. 48 to 51 inclusive, the valve chambers having webs or panels 159 on one or both sides of the movable member 158, as shown. Both the movable members 158 and the panels or webs 159 are provided with openings which may be moved into and out of registry with one another, as indicated in Fig. 49, wherein the valve 157 is indicated as being open while the valve 156 is indicated as being closed. The movable member 158 of these valves is provided at one or both ends outside the valve casing with a stud 160, which is adapted to engage beneath a spring member 161, arranged as shown in Figs. 50 and 51, and secured to the side of the valve housing. The effect is to retain the movable member 158 of the valve resiliently in either of its two terminal positions and to prevent undesired movement thereof, these positions being shown respectively in Figs. 50 and 51, the former showing the valve open and the latter, closed.

Suitable means may be provided for limiting the movements of the valve members in opposite directions. An indicated, such means may comprise studs, as shown at 160, and springs as indicated at 161 on both ends of the valve chambers 156 and 157.

Means are provided for moving the members 158 of the valves 156 and 157 between their open and closed positions in response to the oscillatory movements of the yoke 12. For this purpose, as seen in Fig. 1, a pair of spring abutment members 162 is provided on the standard 9 to engage the movable members 158 of the valves at the termination of the movement of the yoke 12 to the left, as seen in Fig. 1, and to open the valves 156 and 157 in readiness for the active travel of the nozzles with the molds. A second pair of abutment members 163 is provided adjacent to the bumper member 96 and on one arm of each of the supporting structures 2 to engage the opposite ends of the valve members 158 to move them to their closed positions at the termination of the active stroke of the yoke member 12, indicated in dotted lines in Fig. 1. By this means wasting of the pressure and vacuum is to a large extent eliminated, resulting in efficient operation.

Pressure and vacuum are communicated respectively from the valves 156 and 157 through pipes 164 and 165 to chambers 166 and 167 respectively in a valve chest 168. A third chamber 169 in this valve chest is in open communication with the atmosphere below the chest, as indicated at 170, Fig. 41. One of the valve chests, as indicated in Figs. 41 to 47 inclusive, is provided at each end of the yoke member 12, but as these are similar, but one of them will be described. Each valve chest 168 has a common exit chamber 171, which is separated from the chambers 166, 167 and 169 by a pair of walls 172, which are spaced apart to provide slideways for sliding valve members or slide bars 173, 174 and 175, for vacuum, atmospheric air, and super-atmospheric pressure respectively. The walls 172 are provided with openings arranged to register with a corresponding series of openings in the slide bars 173, 174 or 175 at the lowermost position thereof. Each of these slide bars has a cam roller, as indicated at 176, at its upper end, and a second cam roller, indicated at 177, at its lower end, Fig. 43. Means, comprising a leaf spring 178 secured to the housing 168, are provided tending to move the valve member upwardly to valve closing position.

The three valves are each provided with a complementary pair of cams, as indicated in Figs. 45 to 47, wherein the series of cams 179 and 179' are used for controlling flow of super-atmospheric pressure, the cams 180 and 180', for atmospheric air and the cams 181 and 181' for vacuum. These sets of complementary cams are each shown as bar-like members having slots 182, Fig. 40, at their outer ends for longitudinal adjustment. The several cam members are adjustably and interchangeably secured by bolts 183 to suitable stationary parts of the machine, as indicated in Fig. 40, to the standards 9 at the left and to a bracket 184 at the right, this bracket extending between the bracket 89 and the bracket 106. It will be understood that the series of cams 179 to 181 and their complementary cams 179' to 181' may be interchangeable with other cams for effecting slightly different operations as hereinafter set forth and further may be adjusted in order to insure that the several operations occur at selected times.

From the common exit chamber 171 of each of the valve housings 168, a pipe 185 leads to a distributing manifold 186, Figs. 37 and 38. This manifold divides the stream and supplies it at two points 187 and 188 into a second manifold 189, which in turn distributes it to the central air tubes 190 of each of the nozzle members 97. It will be understood that these nozzles 97 are each formed by an outer tube and an inner tube, the plastic material being supplied between these tubes to issue as at hollow tubular body, as hereinafter set forth, and fluid pressure being supplied to the interior of the inner tube 190 by the means just described and under control of the valves in the housing 168. The provision of the two sets of valves in the two housings 168 is purely for purposes of even distribution of the pressure in view of the plurality of molds provided in each group. It is contemplated, however, that but one of these series of valves need be used in certain installatons.

*Takeout and neck finishing means, construction and operation (Figs. 60 to 74 inclusive)*

While articles may be removed from the molds of the machine of the previous figures manually or by any desired type of automatic handling means, there is provided a takeout device, as shown in Figs. 60 and 61, associated with which is a bottle-neck-finishing means, here shown as a reaming device, for machining the inside of the necks of the bottles formed in some instances with semi-finished neck portions, due to the character of the severance of the material used in forming an article or bottle from that remaining within the extrusion nozzle.

Referring first to the takeout portion of the device, there is provided a series of bottle gripping means, which are moved in such a manner as substantially to follow the paths of the bottles while in the mold portions 17, as shown in Figs. 1 and 60. These takeout means are preferably carried by a rotatable support, which is driven in synchronism with the forming machine, and in this case by a common drive. The bottle gripping means serve to convey the bottles to a suitable delivery point, which in this case is illustrated as a portion of a conveyor moving in a straight line and provided with a plurality of spring clips for engaging bottles. Any other desired type of delivery or conveying means could be substituted without departing from the spirit of this invention.

Referring now particularly to the accompanying drawings, Figs. 60 to 62, the takeout and neck finishing means is shown as mounted on a base 191 which is provided with standards 192 providing bearings 193 and 194. Journaled in these bearings is a hollow tubular member 195 which serves to carry the rotatable parts of the takeout and neck finishing means. Secured to the shaft 195 are a pair of spider members 196. Pivotally secured to the spider members 196 by pivot pins 197 are yoke-like members 198, each of which is provided with means for gripping a plurality of bottles or other articles.

Means are provided for rotating the shaft 195 in synchronism with the rotation of the forming machine and preferably in response to the rotation of that machine by a direct drive therebetween, as shown for example in Figs. 63 to 65. For this purpose the shaft 195 is provided at its forward end with a beveled gear 199 with which meshes a beveled pinion 200 mounted on a transversely extending shaft 201. The shaft 201 is suitably journaled in bearings 202 formed in or secured to a laterally extending portion 203 of one of the standards 192. Adjacent to its opposite end the shaft 201 has adjustably secured thereto a gear 204, the position of this gear on the shaft being determined as shown by nuts 205 threaded on the shaft 201 and tightened against the opposite faces of the gear 204, which latter is preferably splined to the shaft by a suitable key entering a groove 206 cut in the shaft. The gear 204 meshes with the teeth of the ring gear 14 secured to one of the disks 7 of the mold carrier of the forming machine. Thus the shaft 195 and parts carried thereby will be continuously rotated in synchronism with the rotation of the forming machine and in response thereto.

Means are provided for controlling and varying the angular position of the yoke members 198 in respect to the spiders 196 during the rotation thereof around the axis of the shaft 195. These means are effective to cause the bottle gripping means of the yoke members substantially to follow the path of the neck of a bottle held in the mold portion 17 of the forming machine, as shown in Fig. 60, wherein one position of the parts is shown in full lines and other positions in dotted lines. This peculiar movement is also utilized to cause the bottle gripping means to bring the bottles to an operative position in respect to the neck finishing means and thereafter to move the bottles to a selected discharge or delivery point.

For this purpose the yoke members are provided intermediate the lengths of their lateral sides or legs with cam rollers 207 which are arranged to follow a predetermined path defined by closed cam tracks 208, which are secured to lateral plates 209, the latter being in turn secured to and/or carried by the standards 192 or extensions thereof, such as the extension 203. By means of these cams, which are similar on each side of the machine in order that the yoke members be given a uniform and controlled movement, the path of the bottle gripping means of the yoke members is predetermined in a desired manner to secure proper operation of the parts.

The substantially horizontal portion 210 of each of the yoke members 209 is formed as a channel-shaped housing in which are mounted for lateral sliding movement bars 211 and 212. These bars are provided at opposite ends of the housing portion 210 with studs 213 and 214 respectively projecting through the ends of the housing. At their opposite ends respectively the bars 211 and 212 are separated from the ends of the housing by compression springs 215 and 216, these springs being retained in position in the housing by means of short cover plates 217 and 218, which also prevent the bars 211 and 212 from being dislodged from the housing. The construction provides for the provision of any desired number of article gripping means, in this case three being shown, as there are three molds in each of the groups 8 and hence three articles must be removed from the portions 17 of each group of molds simultaneously. As shown, the bar 212 carries secured thereto one side 219 of each of three bottle gripping means or tongs, the other side 220 of each of which is carried by a suitable bracket from the other bar 211.

Thus, the bottle gripping means 219 and 220 for grasping each article are resiliently pressed together by the compression springs 215 and 216. This resilient arrangement, in conjunction with the formation of the gripping means, as a sort of two-pronged fork having a recess for engaging the bottle neck, is usually adequate to pick the bottles out of the mold portion 17 without the provision of opening and closing means adjacent to this portion of the travel of the grippers or tongs.

Means are, however, provided for separating the grippers or tongs against the action of the springs 215 and 216 at the discharge point. As shown, such means comprise a pair of cams 221 and 222 for engaging the pins 214 and 213 respectively, as the grippers are moved in a counterclockwise direction, as seen in Fig. 60 about the axis of the shaft 195. This will serve to separate the article gripping portions or tongs 219 and 220 to release an article once it has been engaged in one of the spring clips shown at 223 and carried by a continuous chain 224. It will be understood that if desired the articles could be placed on a subject support, such as a conventional conveyor belt, or at any other desired point, the chain 224 and spring clips 223 being shown merely by way of example. The only requirement for a different delivery point is to locate the cam members 221 and 222 adjacent to such point to engage the studs 213 and 214 at the point it is desired the articles be released from the bottle gripping means.

Considering now the neck finishing means which are provided in association with the takeout means just described, there is preferably provided a plurality of sets of such means, each of which includes a plurality of neck finishing means corresponding in number and relative position to the number and relative position of the molds of each mold group 8. Four sets of finishing means are provided in the device shown in the accompanying drawings, arranged at substantially right angles to one another. Inasmuch, however, as each of these sets is similar to every other, and as each comprises a plurality of similar neck finishing means, but one such means will be described.

The hollow shaft 195 is provided with a laterally projecting hollow stem or standard 225 extending substantially radially therefrom and possibly integral therewith, as shown best in Fig. 72. At its outer end there is telescopically and rotatably mounted in the hollow standard 225 a rotatable neck finishing member, here shown as a reaming tool 226 having a longitudinal bore 227 therein. Adjacent to the inner end of the tool 226 within the end of the hollow standard 225 is an annular groove 228 cut in the member 226. Extending into this groove is a suitable detent or stop member, here shown as a set screw 229 for retaining the tool 226 in the the end of the member 225 while permitting the rotation thereof about an axis radial of the device.

Means are provided for rotating the tools 226. For this purpose each of these tools is provided with a spiral gear 230 secured thereto, as by a key 231, Fig. 73. The gear 230 is in mesh with a complementary spiral gear 232. Three gears 232, one for each of the tools 226 of a transverse row, are mounted on a common shaft 233, which is journaled in the spiders 196 parallel to the center shaft 195. In order to insure the proper meshing of each pair of gears 230 and 232, each of the standards 225 has secured thereto a laterally extending bracket 234 serving as a bearing for the shaft 233. At one or both ends the shaft 233 has secured thereto a pinion 235 which comes at times into mesh with a stationary curved rack 236 arranged to rotate the shaft 233 and hence the neck finishing tools 226 through the mechanism described at the time bottles are brought into operative relation in respect thereto by the gripping means. The racks 236 may be secured to any suitable stationary part of the apparatus, here shown as the plate 209. Thus rotation of the tools 226 is effected in response to the rotation of the takeout means, which is in turn rotated in response to the rotation of the mold carrier of the article forming apparatus previously described.

It is often desirable to supply a fluid to the inside of articles, such as bottles, during the finishing of the necks thereof. This fluid may be liquid or gaseous. It may be utilized for providing any desired chemical or physical treatment for the material of the bottle and/or it may be used for mechanically blowing or washing out chips from the inside of the bottles, which are cut from the necks thereof by the reaming tools 226. The present invention is not restricted to any particular type of fluid, but merely seeks to provide a means for supplying a fluid to the interior of articles during the neck finishing thereof and/or during the time they are held in the takeout or bottle gripping means for any desired purpose.

To this end fluid may be supplied through a pipe 237, Figs. 60, 62 and 72, axially of the bearing 194 to an interior hollow stationary pipe member 238, the inner end of which is closed. The hollow pipe member 138 is provided at its outer end with a laterally extending cup-like portion 239 secured thereto, which is provided with means such as a set screw 240 for gripping the lower portion of the stationary bearing 194 and preventing the rotation of the pipe 238. This pipe is pierced with suitable apertures as shown at 241 of any desired peripheral extent so as to distribute fluid supplied to the interior of the pipe to passages or bores 242 of the hollow standards 225 during their movement through a selected zone in the rotation of the carrier. Inasmuch as the bore 227 of each of the tools 226 is in open communication with the bore 242, fluid supplied through the pipe 237 and through the passage 242 in the stationary tubular member 238 will be supplied through the passage 227 while the tools are being bodily moved through a predetermined zone in the rotation of the takeout means. This fluid will not be supplied through these bores at other times as the passages 242 will be out of registry with the openings 241.

Temperature control means for mold

As stated above, it is contemplated that many different types of plastic materials can be formed by apparatus as herein disclosed. Certain types, including the thermoplastic materials, such as cellulose acetate compounds, require that heat be extracted therefrom in order that the material be rigidified in the mold once it has been shaped to a desired form therein. Other types, for example the thermosetting resins such as "Bakelite B" and the glyptal resins, or other resins which may be polymerized with the aid of a contained catalyst, are set up or rigidified only by the application of heat thereto for a predetermined period of time. In any event, it is desirable that means be provided for controlling the temperature of the molding surfaces in contact with a finished article.

For this purpose suitable means are provided in a manner not fully disclosed herein, but which may be conventional, for supplying a temperature controlling fluid to the bottom portion of each mold through a passage 243, Figs. 11 and 55 to 58. A suitable way of supplying this fluid would be through a hollow portion of the shaft 4 in a manner similar to that herein disclosed for the introduction of a fluid medium to the interior of the takeout apparatus from the pipe 237 through the member 238. Furthermore, as shown in Figs. 6, 7 and 8, the pintle 16 has a hollow central bore 244 which would permit the introduction of a fluid to the mold units through this bore at one end of the mold carrier 15 and the removal thereof through the corresponding bore at the other end thereof. Any other such conventional or desired means may be used for introducing fluid temperature controlling medium into and withdrawing it from the mold units.

The body mold portion 17 of the mold is formed of two spaced shells, as shown in Figs. 11 and 55 to 58, the inner shell including a portion 246 spaced from the outer shell 247 to provide a hollow chamber 248 which communicates with a hollow chamber 249 formed in the bottom of the portion 17 between the spaced bottom walls thereof; and this chamber in turn communicates with the inlet passage 243.

The chamber 248 of the body mold member 17 communicates with chambers 250 in the neck mold portions 18, these portions being formed as shown in Figs. 12 and 13, and the communication between the chambers 248 and 250 being as shown in Figs. 55 to 58 through registering passages 251. When the parts are in assembled relation, the several passages 251 of the neck molds and the body molds are in alignment with each other, as shown and are sufficiently fluidtight for all practical purposes. While the spaces 250 in the neck mold portions are shown open at the juncture of the two halves, it is contemplated that these spaces may each be a hollow chamber in each neck mold portion separate from the other, and that a plurality of passages, each as shown at 251, Figs. 55 to 58, may be used for the flow of fluid between the chamber 248 and the chambers 250 of the neck molds.

The chambers 250 of the neck molds communicate through passages 252, Figs. 12 and 16 to 18, in the neck mold arms 58 with the interior of the hollow tubular member 61, Fig. 11, which is provided with one or more lateral ports 253, registering with corresponding ports in the tubular member 57b, and with the passages 252 of the neck mold arms 58. Thus, temperature controlling fluid may flow from the neck mold through the neck mold arms 58 and thence into and through the tubular member 61 to a suitable discharge point in a manner not shown. It will be understood that a desired type of temperature controlling fluid, either liquid or gaseous, will be selected in view of the characteristics of the plastic material being used and the temperature conditions desired, and further that this fluid may be brought to a desired temperature in any suitable conventional manner (not shown).

Process of making bottles

As above set forth, the present apparatus is intended to carry out the process disclosed in the applicant's co-pending application, now Patent No. 2,128,239, granted August 30, 1938. In general this process includes the introduction of an extrusion nozzle into the mold so that the lower end of the nozzle is at a position approaching the bottom of the mold, substantially as shown in Figs. 52 and 53. The plastic material is extruded through the nozzle in hollow tubular form inasmuch as the material is supplied through an annular passage of the nozzle between the outer tube thereof and the inner or air tube 190. The material contacts with the bottom of the mold and forms a closed end by a mushrooming action, after which pressure is supplied through the inner tube 190 and the plastic material expanded to conform to the mold cavity accompanied by a continued extrusion of the plastic material from the nozzle and a continued withdrawal of the nozzle from the mold.

It may and often is desirable to close the leading end of the hollow tubular body of plastic material prior to any substantial extrusion thereof. For this purpose, as shown, the tube 190 terminates short of the lower end of the outer tube 97 of the nozzle, Fig. 59. The plastic material in a quite fluid condition flows into this outer end, as shown in Fig. 55, and tends to flow together to form a closed end at this position. This tendency may be assisted by the establishment of a vacuum condition within the tube 190 tending to cause the closing of the plastic material across the end of that tube. The means for supplying vacuum to the tube 190 has previously been described. Once the end of the plastic material body has been closed, either as specifically herein disclosed and just described or by extruding the plastic material against the bottom 254 of the mold cavity in a manner substantially as shown in Fig. 53 and in the aforesaid copending application, the extrusion then continues, preferably without interruption, until an amount of plastic material has been extruded sufficient for the forming of an article in the mold. During this period of extrusion of the closed-ended hollow tubular body of plastic material, fluid pressure is supplied through the pipe 190 by the means hereinabove disclosed to expand the plastic material to conformity with the mold. Also, during this same period, the nozzle 97 is gradually withdrawn from the mold cavity, as seen by a comparison of Figs. 55 to 59 inclusive. The plastic material is progressively laid on the bottom and then on the sides and neck portion of the mold cavity, ending up at the position shown on an enlarged scale in Fig. 59.

The mouth ring portion 19 of the mold is preferably provided with a bushing 255, shown in detail in Figs. 54 and 59, and having a relatively sharp lower inner edge 256 to assist in the severance of the plastic material at this point, so as to separate the material forming an article such as a bottle from that remaining within the nozzle. This severance may be assisted by the supplying of a relatively high pressure inside the article and/or by the rather rapid withdrawal of the nozzle 97 from the mold once the article has been completely formed, and under the control of the cam path 108. It will be understood that the configuration of the cam path 108 in the drawings is more or less conventional, but that this path may have a desired configuration. The remainder of the operation comprises the exposing of the formed article to a temperature to rigidify it once it has been formed as aforesaid and severed from the parent body within the nozzle 97 and the several mechanical movements which have been set forth hereinabove. As the severance may be irregular, it is usually desired to finish the neck portion of a bottle formed as aforesaid, which may be done by a machining operation by a rotary neck-finishing means, as the reamer 226 previously described.

During the rigidification of the material forming the plastic articles while they are still in the molds, means may be provided to introduce a fluid, preferably under pressure, into the interiors thereof. Such means may be used alternatively with or in addition to the means hereinabove disclosed for introducing fluid into the articles through the reaming tools and may serve the purpose of holding the plastic material in good heat transferring contact with the molds due to the pressure thereof and/or of treating this material chemically, as by a coagulating fluid, or other desired purposes.

While there is herein shown and described but one general embodiment of the invention with some alternative constructions of certain details, the invention is not limited to any particular detail of construction or to the application of the apparatus herein disclosed to use with any particular type of material, except as required by the appended claims, which are to be construed as broadly as the state of the prior art permits.

I claim:

1. In apparatus for forming hollow articles from plastic material, a mold including a one-part body mold portion, a split neck mold and a solid mouth ring, means for opening said mold to release a completed article formed therein including means for first separating said neck mold and mouth ring as a unit from said body mold by a relative axial movement thereof to free a completed article from said body mold while it is still grasped by said neck mold, means for thereafter separating said mouth ring from said neck mold by a relative axial movement thereof, and means for then opening said neck mold to release the completed article.

2. Apparatus according to claim 1, wherein the means for opening said neck mold to release the completed article are operated by and in response to the axial separation of said neck mold and said mouth ring.

3. Apparatus in accordance with claim 1, wherein the means for opening said neck mold to release the completed article comprise means operated by the axial separation of said mouth ring and said neck mold for first unlocking and thereafter opening the latter.

4. Apparatus in accordance with claim 1, wherein said mouth ring and said neck mold have interengaging portions arranged to maintain the neck mold against opening until said neck mold and said mouth ring are axially separated and wherein the means for opening and closing said neck mold operate in response to a relative axial movement of said neck mold and mouth ring and comprise a wedge effective after the neck mold portions have been unlocked for separating such portions to release a completed article, and a cam means effective on relative axial movement toward one another of said neck mold and said mouth ring for forcing the portions of said neck mold together prior to the last portion of said relative axial movement for locking the neck mold portions against opening.

5. Apparatus for forming hollow articles from plastic material, comprising a mold including a one-part body mold portion, a split neck mold and a solid mouth ring, means for opening said mold to release a completed article formed therein including means for first separating said neck mold and said mouth ring as a unit from said body mold by a relative axial movement thereof to free a completed article from said body mold while it is still grasped by said neck mold, means for thereafter separating said mouth ring from said neck mold by a relative axial movement thereof, means for then opening said neck mold to release a completed article and in such a position as to permit the article to be received again in said body mold, and means for thereafter causing a relative tilting movement of said body mold with respect to said neck mold to present the neck portion of a completed article within said body mold in such a direction that it is easily accessible for removal from said body mold.

6. Apparatus for forming hollow articles from plastic material, comprising a mold support, a mold thereon including a one-part body mold portion pivotally mounted in respect to said support on an axis arranged at a substantial angle to the longitudinal axis of an article formed in said mold, a split neck mold slidably mounted in said support for movement in a direction parallel to the longitudinal axis of said mold, and further comprising portions arranged for additional pivotal opening movement about an axis parallel to the axis of said mold, a solid mouth ring slidably mounted in respect to said support in a direction axial of said mold, a rotatable cam means including three cams, two of which control the axial movements of said neck mold and said mouth ring respectively and the other controls the tilting of said body mold in respect to said support, means for rotating said cam means first to move said neck mold and said mouth ring together axially in respect to said body mold to free a completed article therefrom, then to move said mouth ring further in an axial direction in respect to said neck mold, and thereafter, subsequent to the opening of said neck mold to release a completed article to said body mold, to tilt said body mold to present the neck portion of the completed article at a position easily accessible for the removal of the article therefrom, and means operated by the relative axial movement of said neck mold and said mouth ring as aforesaid for opening said neck mold.

7. Apparatus for forming hollow articles from plastic material, comprising a rotatable carrier, a mold on said carrier including a one-part body mold portion and a split neck mold, means for opening said neck mold to release an article formed therein to said body mold, and means for thereafter tilting said body mold in a direction substantially radially outwardly of said carrier to present the neck portion of the article therein at a position at which it is easily accessible for removing the article from said body mold.

8. Apparatus in accordance with claim 5, wherein said mold is mounted on a rotatable carrier, a single stationary cam adjacent to said carrier, and means controlled by said cam for controlling all the means for operating the several parts of said mold as aforesaid in response to the rotation of said carrier.

9. Apparatus for forming hollow articles from plastic material, comprising a carrier rotatable about a horizontal axis, a mold mounted on said carrier and arranged to be in a position with its axis substantially radial of said carrier and with the neck of an article therein directed outwardly of the carrier during the formation of the article, means to form articles in said mold, said mold comprising a one-part body mold portion, a split neck mold and a solid mouth ring, means for separating the several parts of said mold to leave an article formed therein in said body mold portion, and means for causing a relative rotation of said mold parts in respect to each other to present said body mold portion and the article therein with the neck portion of such article directed substantially radially outwardly in respect to said carrier at the take-out position thereof while said neck mold and said mouth ring are located at a position angularly spaced from the neck portion of said article, whereby to permit ready access to the neck portion of the article for removing it from said body mold.

10. Apparatus for forming hollow articles from plastic material, comprising a carrier rotatable about a horizontal axis, a mold support pivoted to said carrier about a horizontal axis spaced from the first named axis, a mold mounted on said mold support and including a one-part body mold portion pivoted to said mold support on a horizontal axis spaced from the pivotal axis of said mold support to said carrier, a split neck mold mounted for bodily axial sliding movement on said mold support in addition to its opening movement to free an article formed therein, and a solid mouth ring slidably mounted in respect to said mold support in a direction axial of said mold, means for rotating said mold support in respect to said carrier, means for controlling the pivotal movement of said body mold in respect to said mold support, and means for controlling the axial sliding movements of said split neck mold and said solid mouth ring in respect to said mold support, the aforementioned means being so constructed and arranged that said mold is positioned with its axis substantially radial of said carrier and neck-outermost during the forming of an article therein, and at the takeout position of said mold in the rotation of said carrier, said body mold with a completed article therein is positioned substantially radial of said carrier with the neck portion of the article extending outwardly while said mold support, said split neck mold and said solid mouth ring are positioned at a substantial angle in respect to said body mold from the relative position occupied by these parts during the forming of an article in said mold.

11. Apparatus for forming hollow articles from plastic material, comprising a carrier rotatable about a horizontal axis, a mold support pivoted to said carrier about a horizontal axis spaced from the first named axis, a mold mounted on said mold support and including a one-part body mold portion pivoted to said mold support on a horizontal axis spaced from the axis of said mold support to said carrier, a split neck mold mounted for bodily axial sliding movement on said mold support in addition to its opening movement to free an article formed therein, and a solid mouth ring slidably mounted in respect to said mold support in a direction axial of said mold, the above-named means being so constructed and arranged that in moving from the forming position of said mold, in which the axis thereof is radial of the carrier and the neck of an article therein is outermost, to the takeout position, in which the body mold is positioned with its axis substantially radial of the carrier with the neck of the article outermost while the mold support, the neck mold and the mouth ring are positioned at substantially right angles to the body mold in respect to their forming position, the parts are moved in the following sequence: first, the mold support and all parts carried thereby are rotated in respect to the carrier while the neck mold and mouth ring are moved axially away from said body mold; second, the rotation of the mold support and parts carried thereby is continued while the mouth ring is moving axially away from the neck mold and the neck mold is opening to free an article formed in the mold and to permit this article to move downwardly into the body mold; third, the rotation of the mold support in respect to the carrier is continued to a position at substantially right angles to its position during the forming of an article while the body mold is rotated in respect to said mold support in the opposite direction from that of the rotation of the mold support in respect to the carrier to the takeout position as aforesaid.

12. Apparatus for forming hollow articles from plastic material, comprising a carrier rotatable about a horizontal axis, a mold support pivoted to said carrier about a horizontal axis spaced from the first named axis, a mold mounted on said mold support and including a one-part body mold portion pivoted to said mold support on a horizontal axis spaced from the pivotal axis of said mold support to said carrier, a split neck mold mounted for bodily axial sliding movement on said mold support in addition to its opening movement to free an article formed therein, and a solid mouth ring axially slidably mounted in respect to the said mold support, a stationary cam adjacent to said carrier, means controlled by said cam for rotating said mold support in respect to said carrier, a cam member rotatable about the axis of said mold support in respect to said carrier and arranged to be rotated by the means effective to rotate said mold support in respect to said carrier and in response to the configuration of the first named cam but at a speed different from that of the rotation of said mold support in respect to said carrier, means controlled by said cam member for bodily moving said neck mold in respect to said mold support, other means controlled by said cam member for moving said mouth ring in respect to said mold support and in respect to said neck mold, means controlled by the relative bodily movement between said neck mold and said mouth ring for opening and closing said neck mold, and other means controlled by said cam member for tilting said body mold in respect to said mold support.

ENOCH T. FERNGREN.